United States Patent
Bien et al.

[15] 3,669,951
[45] June 13, 1972

[54] REACTIVE AZO DYESTUFFS CONTAINING A-FLUOROPYIMIDINYL GROUP

[72] Inventors: Hans-Samuel Bien, Burscheid; Erich Klauke, Odenthal-Hahnenberg, both of Germany

[73] Assignee: Farbenfabriken Bayer Aktiengesellschaft, Leverkusen, Germany

[22] Filed: Sept. 1, 1967

[21] Appl. No.: 664,943

[30] Foreign Application Priority Data

Sept. 10, 1966 Germany ................. F 50181
March 25, 1967 Germany ................. F 51942

[52] U.S. Cl. .................. 260/146 D, 8/4, 8/34, 8/36, 8/39, 8/40, 8/41 R, 8/41 B, 8/42 R, 8/42 B, 8/50, 8/51, 8/70, 8/71, 117/138.8 R, 117/138.8 D, 117/144, 260/147, 260/154, 260/242, 260/256.4 R, 260/256.4 N, 260/261
[51] Int. Cl. .................. C09b 45/14, C09b 62/24, D06p 1/38
[58] Field of Search ............ 260/154, 146, 146 D, 242, 261

[56] References Cited

UNITED STATES PATENTS

| | | | |
|---|---|---|---|
| 3,213,078 | 10/1965 | Benz et al. | 260/146 |
| 3,262,923 | 7/1966 | Andrew et al. | 260/154 |
| 3,288,777 | 11/1966 | Benz et al. | 260/146 |
| 3,336,284 | 8/1967 | Jager et al. | 260/154 |
| 3,342,798 | 9/1967 | Dussy et al. | 260/146 |
| 3,433,781 | 3/1969 | Ackermann et al. | 260/146 |

*Primary Examiner*—Floyd D. Higel
*Attorney*—Plumley, Tyner & Sandt

[57] ABSTRACT

Reactive dyestuffs of the formula

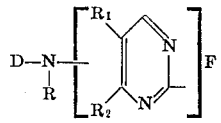

in which D is the residue of an organic dyestuff, R is hydrogen or a lower alkyl, $R_1$ is hydrogen or a substituent, $R_2$ is hydrogen, halogen, substituted or unsubstituted alkyl, alkenyl, aralkyl or aryl radical, carboxylic acid ester radical, carboxylic acid amide radical, alkyl-sulphone, or arylsulphone; and F is fluoro; and process for the preparation of such dyestuffs. These dyestuffs are particularly useful in dyeing materials containing hydroxyl groups and nitrogen, e.g. regenerated cellulose, wool, silk, synthetic polyamide, and polyurethane which dyeings possess excellent fastness to wet processing and good fastness to washing, milling and potting on wool.

24 Claims, No Drawings

REACTIVE AZO DYESTUFFS CONTAINING A-FLUOROPYIMIDINYL GROUP

The present invention relates to valuable new reactive dyestuffs of the general constitution

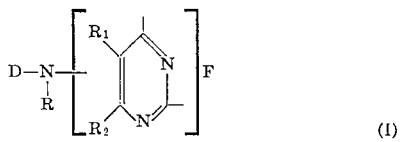

in this formula D denotes the radical of an organic dyestuff, R is hydrogen or a lower alkyl group, $R_1$ is hydrogen or a substituent, $R_2$ means hydrogen, halogen, optionally substituted alkyl, alkenyl, aralkyl or aryl radicals or carboxylic acid ester, carboxylic acid amide, alkyl-sulphone and arylsulphone groups, and F is a fluoro substituent.

In the dyestuffs of the general formula (I) the group —N(R) is linked directly to a carbon atom of the pyrimidine ring in the 2- or 4-position. On the other side the group —N(R) is linked to an aromatic ring of the dyestuff D either directly or via a further bridge member, such as —SO$_2$— or —CO—, as in the case of amide groupings, or via an alkylene group, an alkylene—CO—, an arylene, arylene—SO —, arylene—CO— or a triazine or diazine ring or an arylene-amidosulphonyl group. If such further bridge members contain heterocyclic ring systems, as is the case with triazinyl or pyrimidinyl radicals, these too, may contain reactive atoms or groupings, such as halogen atoms or other substituents of which large numbers are known.

Examples of substituents $R_1$ in the 5-position of the pyrimidine ring are: halogen, such as Cl, Br and F; alkyl radicals, such as —CH$_3$ and —C$_2$H$_5$; substituted alkyl radicals, such as mono-, di- or trichloro- or tribromomethyl, trifluoromethyl radicals; alkenyl radicals, such as vinyl or halovinyl and allyl radicals; —NO$_2$, —CN, carboxylic acid, carboxylic acid ester and optionally N-substituted carboxylic acid or sulphonic acid amide groups, sulphonic acid and sulphonic acid ester groups, alkyl sulphonyl, aralkylsulphonyl or arylsulphonyl radicals.

Suitable substituents $R_2$ in the 6-position of the pyrimidine ring are, for example, halogen, such as Cl, Br and F; alkyl, such as methyl and ethyl radicals; alkenyl, such as vinyl, halovinyl and allyl radicals; and substituted alkyl radicals, such as mono-, di- or trichloro- or -bromo-methyl or trifluoromethyl radicals; carboxylic acid esters, such as the methyl and ethyl esters; carboxylic acid amide groups including the N-substitution products; alkylsulphonyl and arylsulphonyl radicals, such as CH$_3$SO$_2$—, C$_2$H$_5$SO$_2$—, C$_6$H$_5$SO$_2$— and p—Cl—C$_6$H$_4$SO$_2$-.

Dyestuffs in which $R_1$ and $R_2$ denote hydrogen, halogen and/or alkyl radicals, belong to a preferred group of the compounds according to the invention.

The new dyestuffs may contain the radical

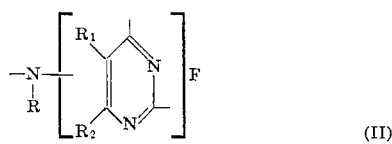

once or several times in the molecule. Dyestuffs with 1 to 2 reactive radicals of this type are preferred for economic reasons.

Suitable pyrimidine rings

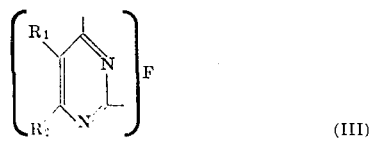

which contain at least one (reactive) fluoro substituent which can be split off are, for example: 2-fluoro-4-pyrimidinyl-, 2,6-difluoro-4-pyrimidinyl, 2,6-difluoro-5-chloro-4-pyrimidinyl, 2-fluoro-5,6-dichloro-4-pyrimidinyl, 2,6-difluoro-5-methyl-4-pyrimidinyl, 2,5-difluoro-6-methyl-4-pyrimidinyl, 2-fluoro-5-methyl-6-chloro-4-pyrimidinyl, 2-fluoro-5-nitro-6-chloro-4-pyrimidinyl, 5-bromo-2-fluoro-4-pyrimidinyl, 2-fluoro-5-cyano-4-pyrimidinyl, 2-fluoro-5-methyl-4-pyrimidinyl, 2,5,6-tri-fluoro-4-pyrimidinyl, 5-chloro-6-chloromethyl-2-fluoro-4-pyrimidinyl, 2,6-difluoro-5-bromo-4-pyrimidinyl, 2-fluoro-5-bromo-6-methyl-4-pyrimidinyl, 2-fluoro-5-bromo-6-chloromethyl-4-pyrimidinyl, 2,6-difluoro-5-chloromethyl-4-pyrimidinyl, 2,6-difluoro-5-nitro-4-pyrimidinyl, 2-fluoro-6-methyl-4-pyrimidinyl, 2-fluoro-5-chloro-6-methyl-4-pyrimidinyl, 2-fluoro-5-chloro-4-pyrimidinyl, 2-fluoro-6-chloro-4-pyrimidinyl, 6-trifluoromethyl-5-chloro-2-fluoro-4-pyrimidinyl, 6-trifluoromethyl-2-fluoro-4-pyrimidinyl, 2-fluoro-5-nitro-4-pyrimidinyl, 2-fluoro-5-trifluoromethyl-4-pyrimidinyl, 2-fluoro-5-methylsulphonyl-4-pyrimidinyl, 2-fluoro-5-phenyl-4-pyrimidinyl, 2-fluoro-5-carbonamido-4-pyrimidinyl, 2-fluoro-5-carbomethoxy-4-pyrimidinyl, 2-fluoro-5-bromo-6-trifluoromethyl-4-pyrimidinyl, 2-fluoro-6-carbonamido-4-pyrimidinyl, 2-fluoro-6-carbomethoxy-4-pyrimidinyl, 2-fluoro-6-phenyl-4-pyrimidinyl, 2-fluoro-6-cyano-4-pyrimidinyl, 2,6-difluoro-5-methylsulphonyl-4-pyrimidinyl, 2-fluoro-5-sulphonamido-4-pyrimidinyl, 2-fluoro-5-chloro-6-carbomethoxy-4-pyrimidinyl, 2,6-difluoro-5-trifluoromethyl-4-pyrimidinyl.

Among the many possibilities of attaching the radical (II) to D, the direct linkage of the groups —N(R) to a carbon atom of a carbocyclic ring of D is preferred. Suitable bridge members of this or another kind, with the inclusion of the group -N(R), are, for example (A standing for the radical of the formula III): —NH—A, —N(CH$_3$)—A, —N(C$_2$H$_5$)—A, —N(C$_3$H$_7$)—A, —CONH—A, —SO$_2$NH—A, —CON(CH$_3$)—A, —SO$_2$N(CH$_3$)—A as well as the corresponding N-ethyl- and N-propylamides, —HN-CO—NH—A, —HN—CH$_2$—CO—NH—A, —N(CH$_3$)—CH$_2$—CONH—A, —HN—CH$_2$—CH$_2$—NH—A —NH—SO$_2$—(CH$_2$)$_{1-3}$—NH—A, —NH—CO—(CH$_2$)$_1$—NH—A, —CH$_2$—NH—CO—(CH$_2$)$_{1-2}$—NH—A,

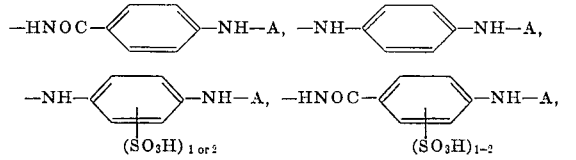

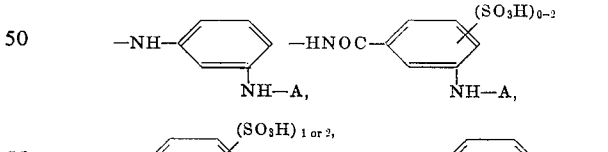

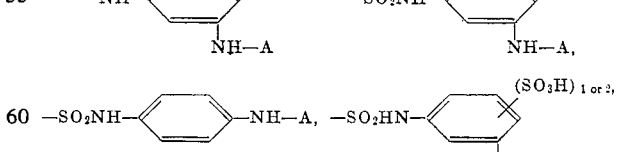

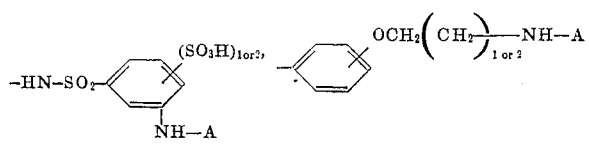

as well as the corresponding N-alkyl(1-5 C)-amides or -amines

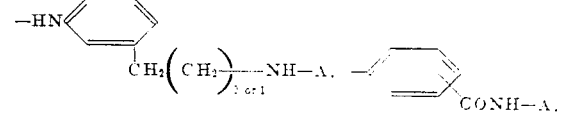

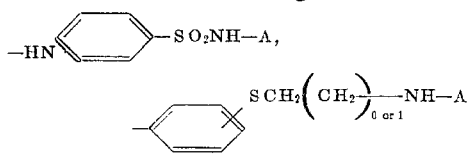

as well as the corresponding N-alkyl(1-3 C)-amides or -amines of the aforesaid compounds.

The new dyestuffs can belong to the most varied classes, for example, to the series of metal-free or metal-containing mono- or polyazo dyestuffs; metal-free or metal-containing azaporphin dyestuffs, such as copper- or nickel-phthalocyanine dyestuffs; anthraquinone, oxazine, dioxazine, triphenylmethane, nitro, azomethine, benzanthrone and dibenzanthrone dyestuffs; and of the polycyclic condensation compounds of anthraquinone, benzanthrone and dibenzathrone compounds. Within the scope of these classes of dyestuffs, dyestuffs of the following general constitutions are particularly valuable, inter alia:

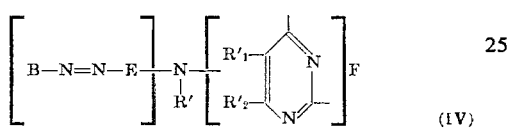

in which B and E represent aromatic, carbocyclic or heterocyclic radicals and, in particular, B is the radical
of a carbocyclic diazo component of the benzene or naphthalene series and E is the radical of an enolic or phenolic coupling component, e.g. a 5-pyrazolone, 5-amino-pyrazole, acetoacetic acid arylamide, hydroxynaphthalene or aminonaphthalene; B and E may otherwise contain any substituents customary in azo dyestuffs, including further azo groups; R' stands for a —CH$_3$ group or, preferably for a hydrogen atom, and R'$_1$ and R'$_2$, independently of one another, stand for hydrogen or halogen groups, such as Cl, Br or F.

Especially valuable dyestuffs of this series are those which are water-soluble and, in particular, those which contain sulphonic acid and/or carboxylic acid groups. The azo dyestuffs may be metal-free or metal-containing, the copper, chromium and cobalt complexes being the preferred metal complexes.

Important azo dyestuffs are, for example, those of the benzene-azo-naphthalene series, the benzene-azo-1-phenyl-5-pyrazolone series, the benzene-azo-aminonaphthalene series, the naphthalene-azo-naphthalene-series, the naphthalene-azo-1-phenyl-pyrazolone-5 series and the stilbene-azo-benzene series, the dyestuffs which contain sulphonic acid groups being again preferred. In the case of metal complex azo dyestuffs, the groups attached to the metal complex are preferably in the o-position to the azo group, for example, in the form of o,o'-dihydroxy-, o-hydroxy-o'-carboxy-, o-carboxy-o'-amino- and o-hydroxy-o'-aminoazo groupings. Particularly eminent types of monoazo dyestuffs of the kind obtainable according to the invention are illustrated by the following formulas:

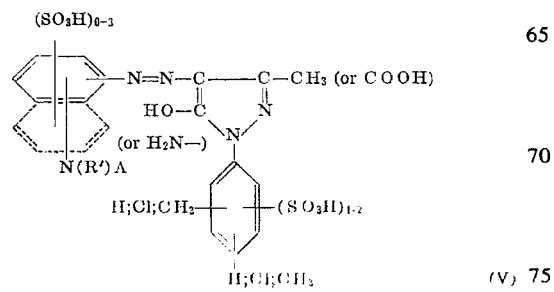

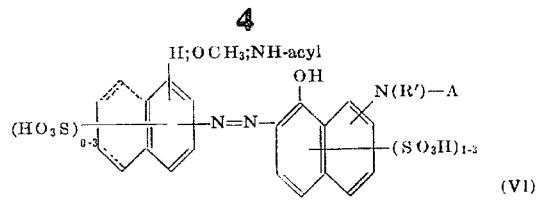

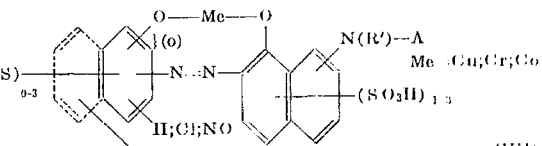

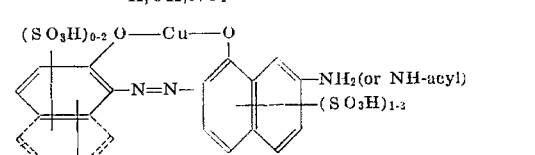

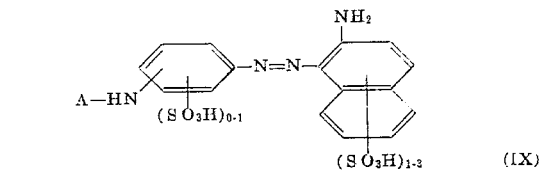

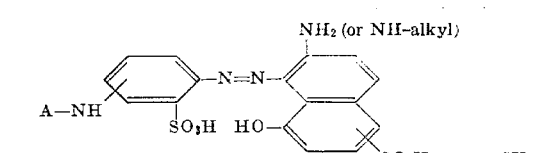

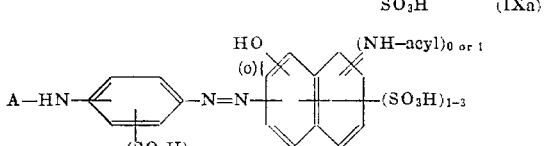

}(o) denotes that the stated radicals stand in the adjacent
(o) position to each other; A stands for the radical of the formula

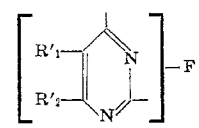

in which R'$_1$ and R'$_2$ have the same meaning as above; or in other words, A stands for a 2-fluoropyrimidine-4-yl ring containing a radical R'$_1$ in the 5-position and a radical R'$_2$ in the 6-position, or A stands for a 4-fluoropyrimidine-2-yl ring containing a radical R'$_1$ in the 5-position and a radical R'$_2$ in the 6-position; "acyl" stands for an acyl radical, in particular a lower aliphatic carbonyl or sulphonyl residue having one to five carbon atoms or an aryl carbonyl or aryl sulphonyl residue of the benzene and substituted benzene series; the nuclei drawn with dotted lines indicate that these nuclei may be present or absent.

2. Anthraquinone dyestuffs

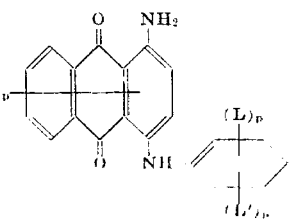

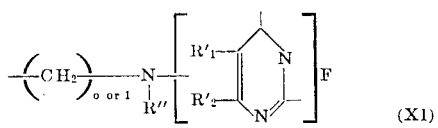

(XI)

in which L and L' denote substituents, especially sulphonic acid groups, p denotes an integer from 0 to 2, R'' is a methyl or ethyl group or hydrogen, R'$_1$ and R'$_2$, independently of one another, are hydrogen or halogen radicals.

3. Phthalocyanine dyestuffs

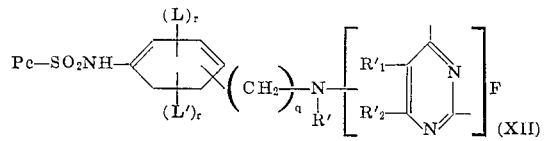

(XII)

in this formula Pc stands for the radical of a nickel- or copper-phthalocyanine, L and L' are substituents, especially sulphonic acid groups, r denotes an integer from 0 to 2, q is the number 0 or 1, R' is a methyl group or, preferably, hydrogen, R'$_1$ and R'$_2$, independently of one another, are hydrogen or halogen radicals. The phthalocyanine radical Pc preferably carries as further substituents 1 — 2 sulphonic acid and/or 1 — 2 sulphonic acid amide groups, such as —SO$_2$NH$_2$, —SO$_2$N-alkyl, —SO$_2$N(alkyl)$_2$ and —SO$_2$NH(aryl) groups, "alkyl" standing for alkyl radicals with one – three carbon atoms.

The above compilation of a selection of suitable azo, anthraquinone and azaporphin dyestuffs and of fluoro-substituted pyrimidine rings does not represent a limitation of the general formulas, either with regard to the preparative possibilities of producing such dyestuffs within the scope of the general formula (I), or with regard to the valuable properties of these products in respect of application techniques. The new dyestuffs may otherwise contain any substituents customary in dyestuffs, such as sulphonic acid, carboxylic acid groups; sulphonamide and carbonamide groups which may be further substituted on the nitrogen atom of the amide; sulphonic acid ester and carboxylic acid ester groups; alkyl, aralkyl and aryl radicals; alkylamino, aralkylamino, arylamino, acylamino, nitro and cyano groups; halogen atoms such as Cl, Br and F; hydroxy, alkoxy, thioether, azo groupings and the like. The dyestuffs may also contain further groupings capable of fixation, such as mono- or dihalo-triazinylamino, mono-, di- or trihalo-pyrimidinylamino, 2,3-dihalo-quinoxaline-6-carbonyl or -6-sulphonylamino, 1,4-dihalophthalazine-6-carbonyl- or -6- sulphonylamino, 2-halo- or 2-alkylsulphonyl- or 2-arylsulphonyl-benzothiazole-5-carbonyl- or 5-sulphonylamino, alkylsulphonyl-pyrimidinyl, arylsulphonyl-pyrimidinyl, esterified sulphonic acid hydroxy alkylamide and hydroxy alkylsulphone groups, sulphofluoride-, haloalkylamino, acryloylamino, haloacylamino groups or other reactive groups.

The new dyestuffs of the formula (I) are obtained by introducing into dyestuffs or dyestuff intermediates, by known methods at least one fluoro-substituted pyrimidine ring

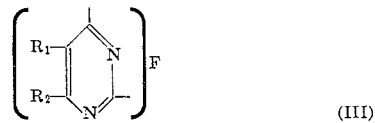

(III)

linked via an amino group —N(R)—. If dyestuff intermediates are used, these are then converted into the desired final dyestuffs in known manner, particularly by a diazotizing, and/or coupling and/or condensing reaction; in the formula (III) R$_1$ denotes hydrogen or a substituent and R$_2$ means hydrogen, halogen, optionally substituted alkyl, alkenyl, aralkyl or aryl radicals, carboxylic acid ester, carboxylic acid amide, alkylsulphone or an arylsulphone group; F stands for a fluorine atom.

The introduction into dyestuffs or dyestuff intermediates, of the radical (III) via an amino group —N(R)— can be carried out by various methods of preparation. For example, dyestuffs or dyestuff intermediates which contain amino or amide groups and exhibit a reactive hydrogen atom on the nitrogen atom of the amine or amide, can be reacted with compounds of the general formula

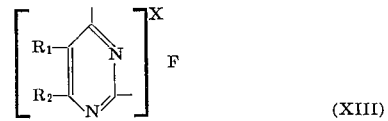

(XIII)

in which R$_1$ and R$_2$ have the same meaning as above, F stands for a fluoro substituent and X for a radical which can be split off as an anion, to form dyestuffs of the general formula (I), and, if dyestuff intermediates are used, these can then be converted into the desired final dyestuffs in a suitable manner. Among the reactive substituents X which can be split off as anionic radicals, the fluoro substituent is of particular interest. Other radicals which can be split off as anions and are suitable according to circumstances are, for example quaternary ammonium groups, such as -N(CH$_3$)$_3$ and -N(C$_2$H$_5$)$_3$.

Heterocyclic pyrimidine compounds of the formula (XIII) which are suitable for the reaction are, for example: 2,4-difluoropyrimidine, 2,4-difluoro-6-methylpyrimidine, 2,6-difluoro-4-methyl-5-chloropyrimidine, 2,4,6-trifluoropyrimidine, 2,4-difluoropyrimidine-5-ethylsulphone, 2,6-difluoro-4-chloro-pyrimidine, 2,4,5,6-tetrafluoropyrimidine, 2,4,6-trifluoro-5-chloropyrimidine, 2,6-difluoro-4-methyl-5-bromopyrimidine, 2,4-difluoro-5,6-dichloro- or -dibromopyrimidine, 4,6-difluoro-2,5-dichloro- or -dibromopyrimidine, 2,6-difluoro-4-bromopyrimidine, 2,4,6-trifluoro-5-bromopyrimidine, 2,4,6-trifluoro-5-chloromethylpyrimidine, 2,4,6-trifluoro-5-nitropyrimidine, 2,4,6-trifluoro-5-cyanopyrimidine, 2,4,6-trifluoropyrimidine-5-carboxylic acid alkyl esters or -5-carboxylic acid amides, 2,6-difluoro-5-methyl-4-chloropyrimidine, 2,6-difluoro-5-chloropyrimidine, 2,4,6-trifluoro-5-methylpyrimidine, 2,4,5-trifluoro-6-methylpyrimidine, 2,4-difluoro-5-nitro-6-chloropyrimidine, 2,4-difluoro-5-cyanopyrimidine, 2,4-difluoro-5-methyl-pyrimidine, 6-trifluoromethyl-5-chloro-2,4-difluoro-pyrimidine, 6-phenyl-2,4-difluoropyrimidine, 6-trifluoromethyl-2,4-difluoropyrimidine, 5-trifluoromethyl-2,4,6-trifluoropyrimidine, 5-trifluoromethyl-2,4-difluoropyrimidine, 2,4-difluoro-5-nitropyrimidine, 2,4-difluoro-5-trifluoromethyl-pyrimidine, 2,4-difluoro-5-methylsulphonyl-pyrimidine, 2,4-difluoro-5-phenylpyrimidine, 2,4-difluoro-5-carbonamido-pyrimidine, 2,4-difluoro-5-carbomethoxy-pyrimidine, 2,4-difluoro-6-trifluoromethyl-pyrimidine, 2,4-difluoro-5-bromo-6-trifluoromethyl-pyrimidine, 2,4-difluoro-6-carbonamido-pyrimidine, 2,4-difluoro-6-carbomethoxy-pyrimidine, 2,4-difluoro-6-phenyl-pyrimidine, 2,4-difluoro-6-cyanopyrimidine, 2,4,6-trifluoro-5-methylsulphonyl-pyrimidine, 2,4-difluoro-5-chloro-6-carbomethoxy-pyrimidine, 2,4-difluoro-5-sulphonamido-pyrimidine.

In the condensation reaction with the dyestuffs or dyestuff intermediates containing amino or amide groups, these pyrimidine derivatives can be assumed to react in the 4-position, the radical X being split off. In the general formulas (I), (II) and (IV) to (XII) the pyrimidine ring is therefore presumably and preferably attached via the 4-position to the radical of the dyestuff containing the N(R)- or N(R')-group.

The fluoro-pyrimidine compounds mentioned above and others which can be used according to the invention are generally readily obtained by reacting the corresponding chloro or bromo compounds with alkali metal fluorides, for example, with potassium fluoride, NaHF$_2$, KSO$_2$F, SOF$_3$, AgF$_2$, or by reacting corresponding OH compounds with SF$_2$, COF$_2$, COClF or cyanuric fluoride, or by heating corresponding diazonium tetrafluoroborates.

Particularly preferred for the reaction according to the invention are those reactive components which correspond to the formula

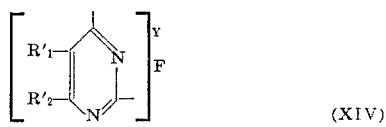

in which $R'_1$ and $R'_2$ independently of one another, denote hydrogen or halogen radicals (Cl, Br of F), and Y is a radical which can be split off as an anion, particularly a fluoro substituent.

The reaction of the dyestuffs or dyestuff intermediates containing amino or amide groups with heterocyclic compounds of the formula (XIII) is carried out in accordance with the type of starting compounds used in an organic, aqueous-organic or aqueous medium at temperatures of −10° C. to 100° C., preferably at 0° to 50° C, in the presence of alkaline condensation agents, such as aqueous alkali metal carbonate or alkali metal hydroxide solutions.

If dyestuff intermediates are used, the condensation products obtained are converted in usual manner into the desired final dyestuffs. This process is primarily interesting for the preparation of azo dyestuffs in that, for example, a diazo and/or coupling component containing a reactive amino or amide group, is first reacted with the reactive component (XIII) or (XIV) and the resultant intermediate subsequently converted by diazotization and/or coupling and/or condensation into an azo dyestuff. In the latter further conversion reactions as are customary in azo dyestuffs can subsequently be carried out, for example, acylating, condensing, reducing and metallizing reactions.

Also when preparing other dyestuffs, especially those of the phthalocyanine and anthraquinone series, the condensation of a reactive component (XIII) or (XIV) can first be performed with an intermediate, for example, with m-phenylene-diamine or an m-phenylene-diamine-sulphonic acid, and the reaction product obtained can subsequently be further condensed with an anthra-quinone-sulphonic acid halide or with a copper- or nickel-phthalocyanine-sulphonic acid halide to form a reactive phthalocyanine dyestuff.

Another variant for the preparation of the new dyestuffs of the formula (I) which is applicable in some cases consists in that in dyestuffs or, in particular, in dyestuff intermediates which contain at least one group of the general formula

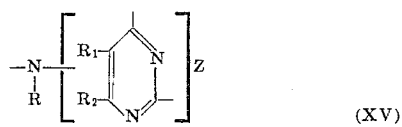

in which R, $R_1$ and $R_2$ have the same meaning as above and Z represents a radical which can be split off as anion, with the exception of a fluoro substituent, Z is exchanged in known manner for a fluoro substituent and, if dyestuff intermediates are used, these are subsequently converted into the desired final dyestuffs. The exchange of one or more substituents Z which can be split off as anions, for example, of Cl- or Br-atoms, for fluoro substituents can be carried out, for example, in the manner already explained.

As has already been mentioned for some cases, the dyestuffs obtainable by the various methods described above can be subjected to further reactions which are customary for dyestuffs in that, for example, metallizable dyestuffs are treated with metal-yielding agents, especially with chromium, cobalt, copper or nickel salts; dyestuffs containing reducible groups, especially nitro groups, are reduced; dyestuffs containing acylatable groups, especially acylatable amino groups, are acylated; or dyestuffs are subsequently treated with sulphonating agents, such as chlorosulphonic acid, oleum or $SO_3$, in chlorinated hydrocarbons, in order to introduce (further) sulphonic acid groups into the products. The last-mentioned process is sometimes of particular importance in the series of anthraquinone and phthalocyanine dyestuffs. Dyestuffs of the formula (I) which contain sulphonic acid and/or carboxylic acid groups are preferred within the scope of the present invention.

Depending upon the number of reactive—HNR—groupings suitable for the conversion reaction which are present in the dyestuff radical or dyestuff intermediates, one or more groupings of the general formula (II) can be incorporated with the dyestuffs. In the majority of cases the number $m = 4$ will not be exceeded, but it is also possible to synthetize dyestuffs, especially those of a higher molecular structure, with more than 4, e.g. with up to eight groupings of the formula (II).

If the dyestuffs produced according to process contain groups forming metal complexes, these can be converted into their metal complex compounds by the action of metal-yielding agents, for example, of copper, nickel, chromium or cobalt salts. They can also be subjected to other conventional conversion reactions, such as diazotizing, coupling acylating and condensing reactions.

The reaction of dyestuffs containing amino groups with reactive components of the formula (XIII) or (XIV) yields groups of particularly preferred dyestuffs, if those amino group-containing starting dyestuffs are used, from which the dyestuffs of the formulas (IV) to (XII) are derived, i.e. those containing the grouping —N(R')—H or —N(R'')—H, instead of the group

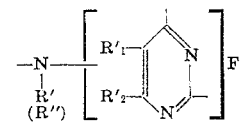

or the group —N(R')—A.

In the production of phthalocyanine dyestuffs it is possible to prepare first a diaminoaryl compound which is mono-condensed with the reaction component (XIII) or (XIV) and subsequently to condense this with, preferably, copper- or nickel-phthalocyanine-sulphonic acid halides; other amino compounds, such as ammonia, aliphatic amino compounds and/or aromatic amino compounds may be added simultaneously or subsequently. In this way, there are obtained phthalocyanine-, preferably copper- or nickel-phthalocyanine-sulphonamide dyestuffs which contain a certain proportion of sulphonarylamide groups carrying the reactive group and, in addition, a certain proportion of non-reactive sulphonamide groups and/or free sulphonic acid groups. Likewise, copper- or nickel-phthalocyanine-sulphonic acid-(aminoaryl)-amides which may contain additional, optionally N-substituted sulphonamide groups of different type and free sulphonic acid groups, can be condensed on the amino group of the aminoaryl radical with reactive components (XIII) or (XIV) to form the new dyestuffs (I).

The new dyestuffs are extremely valuable products which are suitable for a great variety of applications. As water-soluble compounds they are primarily of interest for the dyeing of textile materials containing hydroxyl groups and containing nitrogen, especially textile materials of natural and regenerated cellulose, and also of wool, silk, synthetic polyamide and polyurethane fibers. Due to the reactive fluoro substituent or substituents in the pyrimidine ring, the products are particularly well suited as reactive dyestuffs for the dyeing of cellulose materials by the methods which have recently become known for this purpose. The fastness properties obtained, especially the fastness to wet processing, are excellent.

For dyeing cellulose, the dyestuffs are preferably used in an aqueous solution to which compounds of alkaline reaction, such as alkali metal hydroxide or alkali metal carbonate, or compounds which can be converted into substances of alkaline reaction, such as alkali metal bicarbonate, $Cl_3C$—COONa, can be added. Further auxiliaries may be added to the solution, but these should not react with the dyestuffs in an undesirable manner. Additives of this kind are, for example surface-active substances, such as alkylsulphates; substances preventing the migration of the dyestuff; dyeing auxiliaries such as urea; or inert thickening agents, such as oil-in-water emulsions, tragacanth, starch, alginate or methyl cellulose.

The solutions or pastes thus prepared are applied to the material to be dyed, for example, by padding on a foulard (short bath) or by printing, followed by heating for some time at an elevated temperature, preferably 40° to 150° C. Heating can be carried out in a hot flue, in a steaming apparatus, on heated rollers or by introducing the material into heated concentrated salt baths, alone or successively in any sequence.

If a padding liquor or dyebath without alkali is used, the dry material is subsequently passed through a solution of alkaline reaction to which common salt or Glauber's salt has been added. The addition of salt prevents the dyestuff from migrating from the fiber.

The material to be dyed can also be previously treated with one of the acid-binding agents mentioned above, subsequently treated with the solution or paste of the dyestuff and finally fixed at an elevated temperature as stated.

For dyeing from a long bath, the material is introduced into an aqueous solution of the dyestuff (liquor ratio 1 : 5 to 1 : 40) at room temperature and dyeing is carried out for 40 to 90 minutes, possibly with an increase of temperature up to 20° – 90° C., preferably 30° – 50° C., while adding portions of salt, for example, sodium sulphate, and subsequently of alkali, for example, sodium phosphates, sodium carbonate, NaOH or KOH. The chemical reaction between the dyestuff and the fibers takes place during this operation. After chemical fixation, the dyed material is rinsed hot and finally soaped, whereby unfixed residues of the dyestuff are removed. Dyeings of excellent fastness, especially fastness to wet processing and light, are obtained.

In the so-called cold batch padding process, the subsequent heating of the padded fabric can be saved by storing the fabric at room temperature for some time, for example 2 to 20 hours. In this process there is used a stronger alkali than in the dyeing process from a long bath described above.

For printing materials containing hydroxyl groups, there is used a printing paste consisting of the dyestuff solution, a thickening agent, such as sodium alginate, and a compound of alkaline reaction or splitting off alkali upon heating, such as sodium carbonate, sodium phosphate, potassium carbonate, potassium acetate or sodium or potassium hydrogen carbonate, and the printed material is rinsed and soaped.

If the dyestuffs contain groupings forming metal complexes, the fastness properties of the dyeings and prints can frequently be improved by an after-treatment with metal-yielding agents, such as copper salts, for example, copper sulphate, chromium, cobalt or nickel salts, such as chromium acetate, cobalt sulphate or nickel sulphate.

Textile materials containing amide groups, such as wool, silk, synthetic polyamide and polyurethane fibers, are generally dyed by the dyeing methods customarily used for this purpose in the acid to neutral range, a final increase of the pH value of the dye bath, for example, to pH 6.5 to pH 8.5, being sometimes of advantage.

For example, the dyestuffs are applied to synthetic polyamide fabrics as solutions or, preferably, in dispersed form and subsequently after-treated, optionally together with (preferably smaller amounts) of acid-binding agents, such as sodium carbonate. Particularly advantageous results are achieved with those dyestuffs which are insoluble or only sparingly soluble in water. These are worked up by usual methods and with the addition of the known auxiliaries to form a dyestuff dispersion and are applied in this form in the dye bath and/or padding liquor or in a printing paste. Auxiliaries suitable for this application are, inter alia, compounds which prevent the migration of the dyestuff on the fiber, such as cellulose ethers, alkali metal chlorides and sulphates; wetting agents, such as condensation products from ethylene oxide and fatty alcohols or phenols, sulphonated fatty alcohols; solvents, such as thiodiglycol; and also thickening agents, such as starch, tragacanth, alginate thickening, gum arabic etc.

The after-treatment of the dyeings, impregnations and prints obtained on fabrics of polyamide fibers is preferably carried out at a temperature of 50° to 110° C. for 5 to 60 minutes. In the case where the dyestuffs used contain groupings forming metal complexes, the fastness properties of the dyeings can again sometimes be improved with metal-yielding agents, such as copper salts, for example, copper sulphate, or chromium, cobalt and nickel salts, such as chromium acetate, cobalt sulphate or nickel sulphate.

The dyeings which can be obtained with the new dyestuffs are generally characterized by good to very good fastness properties, especially by excellent fastness to wet processing.

Compared with the constitutionally most closely related known reactive dyestuffs containing chloro- or bromo-pyrimidinylamino groups, as are described, for example, in Belgian Patent specifications Nos. 572,973; 573,299 and 578,742, the new products of the formula (I) have essential advantages with regard to application techniques. In comparison with the most closely related trichloropyrimidinyl dyestuffs for example, the new dyestuffs which contain a 2,6-difluoro-5-chloro-pyrimidinylamino or a 2-fluoro-5,6-dichloro-pyrimidinylamino radical, surprisingly, give a better dyestuff yield on cotton and regenerated fibers and are superior with regard to color depth when dyed from a long bath. In contrast to the known chloropyrimidine reactive dyestuffs, the new fluoropyrimidine reactive dyestuffs are also well suited for the so-called cold batch padding process for cotton and regenerated fibers. In the printing process the new dyestuffs can be used for rapid fixation. The bond between the fiber and the dyestuffs in an alkaline medium is frequently stronger than with the known dyestuffs.

The new fluoropyrimidine reactive dyestuffs are also superior to the known chloropyrimidine dyestuffs in that they yield valuable dyeings of good fastness to washing, milling and potting on wool. Dyeings which are fast to wet processing can also be obtained on silk and synthetic superpolyamide and - polyurethane fibers.

In the following Examples the parts are parts by weight, unless otherwise stated.

EXAMPLE 1

To a solution of 34.7 parts of the sodium salt of 2-aminonaphthalene-4,8-disulphonic acid and 7 parts sodium nitrite in 300 parts of water there are added 28 parts by volume of concentrated hydrochloric acid, while cooling with ice, and the mixture is stirred at 0° – 10° C. for one-half hour. After removing the excess nitrous acid, 10.7 parts 3-aminotoluene dissolved in 10 parts of concentrated hydrochloric acid and 150 parts of water are added and the coupling is completed by neutralizing the mixture to pH 3 – 5. The resultant aminoazo dyestuff is salted out, filtered off with suction, washed and then redissolved at pH 7 to 140 parts of water and 200 parts acetone with the addition of a sodium hydroxide solution. 19.2 Parts 2,4,6-trifluoro-5-chloro-pyrimidine are added dropwise to this solution at 20° – 30° C. and a pH of 5.5 – 6 is maintained by means of a 2N sodium carbonate solution. When the reaction is completed, the resultant dyestuff of the presumable formula

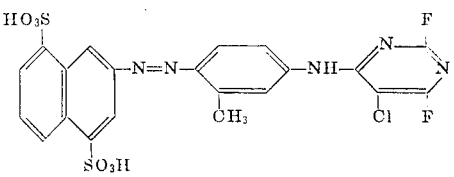

is salted out with 210 parts of a saturated sodium chloride solution, the product which crystallizes in the form of yellow needles is filtered off with suction, washed with a 2 percent sodium chloride solution and dried in a vacuum at 50° C.

When a cellulose fabric is printed with a printing paste which contains, per kilogram, 15 g of the dyestuff, 100 g urea, 300 ml of water, 500 g of alginate thickening (60 g sodium alginate per kg of thickening) and 20 g sodium carbonate, and which has been made up with water to 1 kilogram, the fabric is then dried, steamed at 105° C. for 1 minute, rinsed with hot water and soaped at the boil, an intense reddish yellow print of good fastness to washing and light is obtained.

EXAMPLE 2

0.1 mole of the copper complex compound of the formula

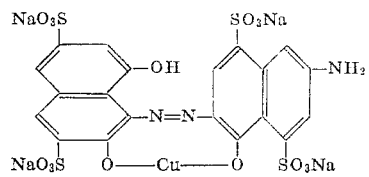

(prepared according to the instructions of German Patent Specification No. 1,117,235 by coupling diazotized 1-mino-8-(benzene-sulphonyloxy)-naphthalene-disulphonic acid-(3,6) in a soda-alkaline medium with the equivalent amount of 2-acetyl-amino- 5-hydroxynaphthalene-disulphonic acid-(4,8), conversion of the monoazo compound into the copper complex by oxidative coppering, and hydrolysis of the acetyl and benzene-sulphonyl groups) are dissolved at pH 6 – 6.5 in 2,500 parts by volume of water at 60° – 65° C. and mixed at 20° – 30° C. with 0.12 mole 2,4,6-trifluoro-5-chloropyrimidine.

A pH of 6 – 6.5 is maintained during the condensation by the addition of a sodium carbonate solution. When the reaction is completed, the dyestuff is salted out and isolated. When dried, the dyestuff is a dark powder which dissolves in water to give a blue color.

One hundred parts by weight of a cotton fabric are treated on the foulard at room temperature with an aqueous solution containing 2 percent of the dyestuff, 15 g/liter of sodium hydrogen carbonate and 150 g/liter of urea, subjected to intermediate drying, heated at 140° C. for 2 minutes, then rinsed and soaped at the boil. The fabric is dyed in very clear blue shades fast to wet processing.

EXAMPLE 3

Forty six parts of the monoazo dyestuff obtained in analogy with Example 1 by coupling diazotized 2-aminonaphthalene-4,8-disulphonic acid with 3-methylamino-toluene are dissolved at 20° – 30° C. in 400 parts of water and 100 parts acetone, and 20 parts 2,4,6-trifluoro-5-chloropyrimidine are added dropwise while maintaining a pH of 6 – 7 by means of a 2N sodium carbonate solution; the condensation is continued until a sample no longer exhibits a change of color when acidified. The resultant dyestuff which has the presumable formula

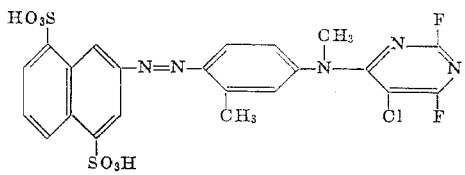

is salted out, filtered off with suction, washed and dried at 30° C. in a vacuum.

A cotton fabric is impregnated with a solution at 20° – 25° C, which contains, per liter of liquor, 20 g of the above dyestuff and 0.5 g of a non-ionic wetting agent (e.g. a polyhydroxyethylated oleyl alcohol) as well as 150 g urea and 15 g sodium bicarbonate. The fabric is subsequently squeezed between two rubber rollers to a moisture content of about 100 percent. After an intermediate drying at 50° – 60° C, the fabric is heated at 140° C. for 2 minutes, the dyeing so obtained is thoroughly rinsed with hot water and treated at the boil for 20 minutes with a solution containing, per liter, 5 g of Marseilles soap and 2 g sodium carbonate. After rinsing and drying, there is obtained an intense reddish yellow dyeing of good fastness to wet processing, rubbing and light.

In the following Table there are listed the diazo components, coupling components and reactive components linkable to the amino group, from which dyestuffs can be synthetized in analogy with the instructions given in Example 1 – 3, the shades — obtained by one of the methods of application described above — being likewise stated in the Table.

Abbreviations for the reactive components:
A = 2,4,6-trifluoro-5-chloropyrimidine
B = 2,4,6-trifluoropyrimidine

| Ex. No. | Diazo Component | Coupling Component | Reactive Component | Shade |
|---|---|---|---|---|
| 4 | 2-aminonaphthalene-4,8-disulphonic acid | 1-amino-2-methoxy-5-methylbenzene | A | yellow |
| 5 | " | " | B | yellow |
| 6 | 1-aminonaphthalene-3,6-disulphonic acid | 1-amino-3-methyl-benzene | A | yellow |
| 7 | " | " | B | yellow |
| 8 | 2-aminonaphthalene-5,7-disulphonic acid | 1-amino-3-methyl-benzene | A | yellow |
| 9 | " | " | B | yellow |
| 10 | 2-aminonaphthalene-6,8-disulphonic acid | 1-amino-3-methyl-benzene | A | yellow |
| 11 | " | " | B | yellow |
| 12 | 4-aminoazobenzene-3,4'-disulphonic acid | 1-amino-3-methyl-benzene | A | brown-yellow |
| 13 | 1-aminobenzene-4-sulphonic acid → 1-aminonaphthalene-6-sulphonic acid | 1-amino-3-methyl-benzene | B | brown-yellow |
| 14 | 2-(3'-sulpho-4'-aminophenyl)-6-methylbenzothiazole-7-sulphonic acid | " | A | yellow |
| 15 | 2-aminonaphthalene-4,8-disulphonic acid | 1-methylamino-3-methoxybenzene | B | yellow |
| 16 | " | 1-amino-3-acetyl-aminobenzene | A | yellow |
| 17 | " | aniline | A | yellow |

EXAMPLE 18

To a solution of 36.5 parts of the sodium salt of 1-amino-8-hydroxynaphthalene-3,6-disulphonic acid in 200 parts of water there are added dropwise at 8° – 10° C. 20 parts 2,4,6-trifluoro-5-chloropyrimidine, and a pH of 5.5 – 6 is maintained by continuous neutralization of the liberated hydrogen fluoride. The reaction is observed by chromatography. The resultant solution of the dyestuff intermediate is poured into 900 parts of water and coupled at a pH of 7 – 8 and at 0° – 5° C. with 17.5 parts of diazotized 2-aminobenzene-sulphonic acid dissolved in 200 parts of water. The product is salted out at a final pH of 6.5 with 80 parts sodium chloride, filtered off with suction and washed with a 10 percent sodium chloride solution. Drying is carried out in a vacuum at 30° – 40° C. The dyestuff

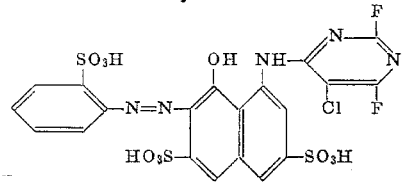

forms red small needles.

When a fabric of cotton or regenerated cellulose is dyed or printed with this dyestuff according to one of the processes described in Example 1 – 3, clear bluish red dyeings and prints of good fastness to wet processing, rubbing and light are obtained.

Equally good results are obtained by the following method:

Fifty g of a cotton skein are dyed in 1 liter of a dyebath containing 1.5 g of the above dyestuff by adding 50 g sodium chloride in several portions at 20° to 30° C. within 30 minutes, subsequently adding 20 g sodium carbonate and treating the material at the same temperature for 60 minutes. After rinsing, soaping at the boil and drying, a bluish red dyeing of good fastness to wet processing, rubbing and light is obtained.

In the following Table there are listed the shades of further dyestuffs which are synthetized from the likewise specified diazo components, coupling components and reactive components linkable to the amino group in the latter, in analogy with the instructions given in Example 18 or also by reacting the corresponding aminoazo dyestuff with the reactive components, and which can be dyed or printed on to cellulose materials by one of the methods described above:

Abbreviations for reactive components as in Table of Example

| Ex. No. | Diazo component | Coupling component | Reactive component | Shade |
|---|---|---|---|---|
| 19 | 1-aminobenzene-2-sulphonic acid | 1-amino-8-hydroxy-naphthalene-3,6-disulphonic acid | B | red |
| 20 | aminobenzene | 1-(3'-amino-benzene-amino)-8-hydroxy-naphthalene-3,6-disulphonic acid | A | red |
| 21 | " | " | B | red |
| 22 | 1-amino-2-carboxy-benzene-4-sulphonic acid | 1-amino-8-hydroxy-naphthalene-3,6-disulphonic acid | A | red |
| 23 | 1-amino-4-methyl-benzene-2-sulphonic acid | " | A | red |
| 24 | 1-amino-3-acetyl-aminobenzene-6-sulphonic acid | " | B | red |
| 25 | 1-amino-3-(2'-[4''-sulpho-phenylamino]-4'-chlorotriazine-1',3',5'-yl-6')-aminobenzene6-sulphonic acid | " | A | red |
| 26 | 1-aminobenzene-2-sulphonic acid | 2-amino-5-hydroxy-naphthalene-7-sulphonic acid | A | orange |
| 26a | 1-amino-3-(2'-[4''-sulphophenylamino]-4'-methylamino-triazine-1',3',5'-yl-6')-aminobenzene-6-sulphonic acid | 2-amino-5-hydroxy-naphthalene-7-sulphonic acid | A | orange |
| 27 | 1-aminobenzene-2-sulphonic acid | 2-methylamino-5-hydroxy-naphthalene 7-sulphonic acid | A | orange |
| 28 | 1-amino-4-acetyl-amino-6-sulphonic acid | " | A | scarlet |
| 29 | " | 2-amino-5-hydroxy-naphthalene-7-sulphonic acid | A | scarlet |

EXAMPLE 30

To a solution of 21 parts of the sodium salt of 1,3-diaminobenzene-6-sulphonic acid in 100 parts of water there are added with good stirring 20.0 parts 2,4,6-trifluoro-5-chloropyrimidine and the mixture is stirred at 20° – 30° C., while continuously neutralizing the liberated hydrofluoric acid to pH 6 – 7, until a sample which is diazotized and coupled with 1-hydroxynaphthalene-4-sulphonic acid yields a clear yellowish red coloration. The resultant dyestuff intermediate is directly diazotized, after the addition of ice, with 7 parts sodium nitrite and 28 parts of concentrated hydrochloric acid and subsequently combined with a previously prepared solution of 47 parts of the sodium salt of 1-benzoyl-amino-8-hydroxynaphthalene-3,6-disulphonic acid and 12 parts sodium carbonate in 200 parts of water, whereby coupling takes place to give the dyestuff of the formula

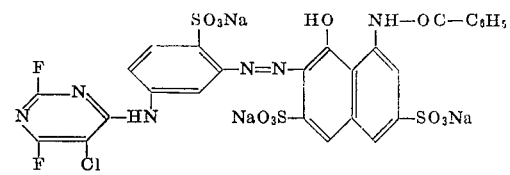

which is salted out, filtered off with suction, washed and dried at 30° – 40° C. in a vacuum. The dyestuff readily dissolves in water to give a red color and yields on cellulose materials by one of the processes described above clear bluish red dyeings and prints.

In the following Table there are listed the shades and the pH value of the coupling medium of dyestuffs which are prepared in analogy with the instructions of Example 30 from a diazo component containing a further, preferably acylatable amino group, from a coupling component and from a reactive component linkable with the diazo component. The methods described above can be used for dyeing and printing cellulose materials with the dyestuffs of the Table.

Abbreviations for reactive components as in Table of Example 3

| Example No. | Diazo component | Coupling component | Reactive component | pH of coupling medium | Shade |
|---|---|---|---|---|---|
| 31 | 1,3-diaminobenzene-4-sulphonic acid. | 2-aminonaphthalene-5,7-disulphonic acid | A | 4–5 | Orange. |
| 32 | do | 2-aminonaphthalene-3, 6-disulphonic acid | A | 4–5 | Do. |
| 33 | do | 2-aminonaphthalene-6-sulphonic acid | B | 4–5 | Do. |
| 34 | do | 2-N-methylamino-8-hydroxynaphthalene-6-sulphonic acid | A | 4–5 | Orange. |
| 35 | do | 1-(3',5'-dichloro-1',2'-thiazole-4'-carbonamido)-8-hydroxynaphthalene-3, 6-disulphonic acid. | A | 7–8 | Red. |
| 36 | do | 1-(2',4'-dihydroxytriazine-1',3',5'-yl-6'-amino)-8-hydroxynaphthalene-3,6-disulphonic acid. | B | 7–8 | Red. |
| 37 | do | 1-(3',5'-dichloro-1',2'-thiazole-4'-carbonamido)-8-hydroxynaphthalene-3,6-disulphonic acid. | A | 7–8 | Red. |
| 38 | do | 2-hydroxynaphthalene-3,6-disulphonic acid | A | 8 | Scarlet. |
| 39 | do | 1-acetylamino-8-hydroxynaphthalene-3,6-disulphonic acid | B | 7–8 | Red. |
| 40 | do | 1-(3'-sulphophenyl)-3-methyl-pyrazolone-5 | A | 6 | Yellow. |
| 41 | do | 1-(2',5'-dichloro-4'-sulphophenyl)-3-methyl-pyrazolone-5 | A | 6 | Do. |
| 42 | do | 1-(5',7'-disulphonaphthyl-2')-3-methyl-pyrazolone-5 | A | 6 | Do. |
| 43 | do | 1-(3'-sulphophenyl)-3-methyl-5-aminopyrazole | A | 6 | Do. |
| 44 | 1,4-diaminobenzene-3-sulphonic acid. | 2-amino-8-hydroxynaphthalene-6-sulphonic acid | A | 4–5 | Red. |
| 45 | do | 2-acetylamino-5-hydroxy-naphthalene-7-sulphonic acid | A | 6–7 | Scarlet. |
| 46 | do | 1-acetylamino-5-hydroxy-naphthalene-7-sulphonic acid | B | 6–7 | Red. |

EXAMPLE 47

51.6 Parts of the dyestuff of the formula

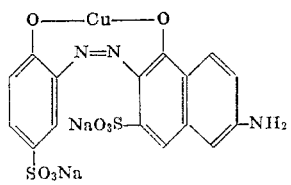

obtained by diazotization of 1-hydroxy-2-aminobenzene-4-sulphonic acid and coupling with 2-amino-5-hydroxynaphthalene-7-sulphonic acid in water/pyridine in the presence of sodium carbonate and subsequent treatment with a copper-yielding agent, are dissolved at pH 7 in 1,500 parts of water. 20.0 Parts 2,4,6-trifluoro-5-chloropyrimidine are added dropwise at 20° – 30° C. with good stirring, and the liberated hydrofluoric acid is continuously neutralized to a pH of 6 – 7 by means of a sodium carbonate solution. When free amino groups can no longer be detected, the resultant reactive dyestuff of the formula

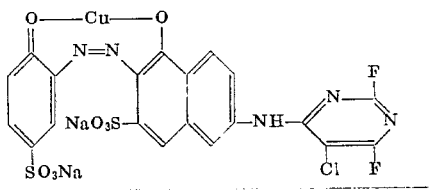

is salted out, pressed off, washed and dried in a vacuum at 30° – 40° C. Fabrics of cellulose materials can be dyed or printed with this dyestuff by one of the methods described above in ruby shades fast to wet processing, rubbing and light.

In the following Table there are listed the heavy metal complexes of further aminoazo dyestuffs and the reactive components linkable to the amino group, as well as the shades of these dyestuffs on cellulose materials. The preparation of the aminoazo dyestuffs and their metal complexes and the reaction thereof with the reactive components can be carried out in analogy with the instructions of Example 47.

Abbreviations for reactive components as in Table of Example 3

| Example No. | Aminoazo dyestuff | Complex linked heavy metal | Reactive component | Shade |
|---|---|---|---|---|
| 48 | 1-hydroxy-2-aminobenzene-4,6-disulphonic acid → 2-amino-5-hydroxynaphthalene-7-sulphonic acid. | Cu | A | Ruby. |
| 49 | 1-hydroxy-2-aminobenzene-4-sulphonic acid → 2-ethylamino-5-hydroxynaphthalene-7-sulphonic acid. | Cu | A | Do. |
| 50 | 1-amino-2-hydroxy-6-nitronaphthalene-4-sulphonic acid → 2-amino-5-hydroxynaphthalene-7-sulphonic acid. | Cu | A | Do. |
| 51 | 1-amino-2-hydroxy-6-nitronaphthalene-4-sulphonic acid → 2-amino-5-hydroxynaphthalene-7-sulphonic acid. | Cr | A | Greenish grey. |
| 52 | 1-amino-2-hydroxy-6-nitronaphthalene-4-sulphonic acid → 1-amino-8-hydroxynaphthalene-4-sulphonic acid. | Co | B | Reddish black. |
| 53 | 1-amino-2-hydroxy-5-methylsulphonyl-benzene → 1-amino-8-hydroxynaphthalene-3,6-disulphonic acid. | Cu | A | Violet. |
| 54 | do | Co | A | Grey. |
| 55 | do | Cr | A | Greenish black. |
| 56 | 1-amino-2-methylbenzene-4-sulphonic acid → 1-amino-2-hydroxy-5-methylbenzene → 1-amino-8-hydroxynaphthalene-4,6-disulphonic acid. | Cu | B | Blue. |
| 57 | do | Co | B | Grey. |
| 58 | do | Cr | A | Greenish black. |
| 59 | (1-amino-2-chlorobenzene-4-sulphonic acid → 1-hydroxy-2-acetylaminobenzene), hydrolysed, → 1-amino-8-hydroxynaphthalene-3,6-disulphonic acid. | Cu | A | Navy blue. |
| 60 | do | Co | A | Grey. |
| 61 | 1-amino-8-hydroxynaphthalene-4-sulphonic acid ← 1-hydroxy-2,6-diaminobenzene-4-sulphonic acid → 1,3-dihydroxybenzene. | Co | A | Black. |
| 62 | 1-amino-8-hydroxynaphthalene-3,6-disulphonic acid ← 1-hydroxy-2,6-diaminobenzene-4-sulphonic acid → 2-hydroxynaphthalene. | Co | A | Do. |
| 63 | 1-amino-8-hydroxynaphthalene-4-sulphonic acid ← 1-hydroxy-2,6-diaminobenzene-4-sulphonic acid → 3-methyl-pyrazolone-(5). | Co | A | Do. |

EXAMPLE 64

Ninety six Parts (referred to 100 percent goods) of the copper-phthalocyanine tetrasulphochloride freshly prepared in the usual manner by the reaction of chlorosulphonic acid and thionyl chloride with copper-phthalocyanine, or of the isomeric copper-phthalocyanine tetrasulphochloride synthetized from 1-sulpho-benzene-3,4-dicarboxylic acid via the corresponding copper-phthalocyanine-tetrasulphonic acid, are suspended in the form of the moist, thoroughly washed filter cake in 500 parts of water and 500 parts of ice, a solution of 50 parts 1,3-diaminobenzene in 500 parts of water is added and the pH is adjusted to 8.5 by means of sodium carbonate. The suspension is stirred at room temperature for 24 hours and the pH is constantly maintained at 8.5 by the continuous addition of sodium carbonate. The resultant condensation product is precipitated at pH 1 – 2 by the addition of sodium chloride, filtered off with suction, washed and then redissolved neutral in 1,000 parts of water. Fifty seven Parts 2,4,6-trifluoro-5-chloropyrimidine are introduced into the blue solution with intense stirring, and the mixture is stirred at 20° – 30° C, while continuously neutralizing to pH 6 by means of a sodium carbonate solution, until free amino groups can no longer be detected. The reactive dyestuff of the formula $$\left[ Cu\text{-phthalocyanine} \right]{-}(SO_3Na)_n$$

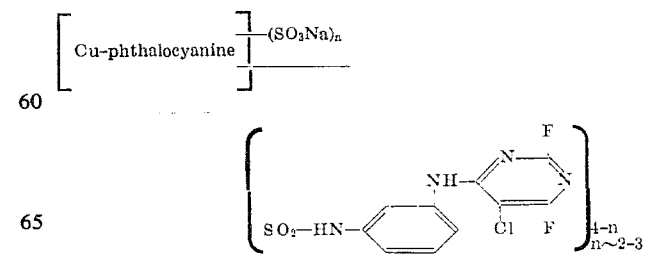

so obtained is salted out, washed and dried at 30° – 40° C in a vacuum. It is a dark-blue powder which dissolves in water to give a blue color and dyes cotton and regenerated cellulose by one of the dyeing or printing processes described above in clear blue shades of good fastness to wet processing, rubbing and light.

Instead of the 96 parts copper-phthalocyanine tetrasulphochloride, there may be used in a process which is otherwise the same as in Example 64 – 87 parts (referred to 100 percent goods) of the copper- or nickel-phthalocyanine trisulphochloride obtained by the reaction of chlorosulphonic acid with copper- or nickel-phthalocyanine, in the form of the moist filter cake thoroughly washed with ice-water; reactive dyestuffs dyeing in clear blue shades are then likewise obtained.

By working as described in Example 64, but starting from 87 parts copper-phthalocyanine trisulphochloride and replacing the 50 parts of the sodium salt of 1,3-diaminobenzene-4-sulphonic acid with 90 parts of the sodium salt of 4,4'-diaminodiphenyl-2,2'-disulphonic acid or 90 parts of the sodium salt of 4,4'-diamino-stilbene-2,2'-disulphonic acid, there are likewise obtained reactive dyestuffs which dye cellulose materials by one of the methods described above in clear blue shades fast to wet processing, rubbing and light.

If 4',4'',4''',4''''-tetraphenyl-Cu-phthalocyanine is used as starting material, there is obtained, after sulphochlorination, reaction with 1,3-phenylene-diamine and acylation with 2,4,6-trifluoro-5-chloropyrimidine, a reactive dyestuff which dyes cellulose materials in the presence of acid-binding agents in clear green shades fast to wet processing and light.

EXAMPLE 65

Sixty three Parts 1-amino-4-(4'-aminophenyl)-aminoanthraquinone-2,5,8-trisulphonic acid are dissolved in 630 parts of water, the solution is adjusted to pH 6 by means of a sodium hydroxide solution, 18 parts 2,4,6-trifluoro-5-chloropyrimidine are then added dropwise at 0° – 5° C. and a pH of 6 – 6.5 is maintained by means of a sodium carbonate solution. When the reaction is completed, 7 parts potassium chloride are added, the product is filtered off with suction and washed with a 3 percent potassium chloride solution. The dyestuff which is obtained in the form of blue-green needles is dried in a vacuum at 30° – 40° C. It presumably has the formula

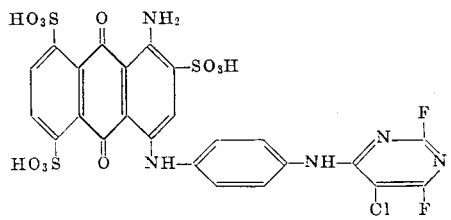

and dyes cotton in greenish blue shades.

EXAMPLE 66

If the procedure described in Example 47 is followed but, instead of the copper-containing amino-monoazo dyestuff there used, the equivalent amount of the chromium complex of the aminoazo dyestuff obtained by coupling diazotized 1-amino-2-hydroxy-3-chlorobenzene-5-sulphonic acid with 1-[3'-(3''-aminophenyl)]-sulphonylimido-sulphonyl-phenyl-3-methyl-pyrazolone-(5) is used as starting material, then a reactive dyestuff is obtained, which dyes cellulose materials by one of the methods described above in yellow-brown shades of good fastness to wet processing, rubbing and light.

EXAMPLE 67

0.1 Mole of the copper complex compound

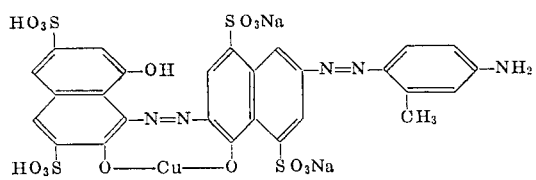

is dissolved in 3,000 parts by volume of water at pH 6 and combined at a temperature of 20° – +° C, while stirring, with 16.8 parts by weight (0.1 mole) 2,4,6-trifluoro-5-chloropyrimidine, a pH of 6 being maintained by means of a 2N potassium carbonate solution. The mixture is stirred until the condensation is completed, the dyestuff is separated by the addition of a little sodium chloride and isolated. The residue is washed with acetone and dried at room temperature under reduced pressure. A dark powder is obtained, which dissolves in water to give a green color and dyes cotton by the methods described in Examples 1 – 3 in green shades.

A cotton fabric is impregnated with a solution at 20° – 25° C. containing, per liter, 25 g of the above dyestuff and 0.5 g of a non-ionic wetting agent (e.g. a polyethoxylated oleyl alcohol), 150 g urea and 20 g sodium carbonate. The fabric is subsequently squeezed between two rubber rollers to a moisture content of about 100 percent. After an intermediate drying at 50° – 60° C., the fabric is heated at 140° C. for 2 minutes, the dyeing so obtained is thoroughly rinsed with hot water and treated for 20 minutes at the boil with a solution containing, per liter, 5 g of Marseilles soap and 2 g sodium carbonate. After rinsing and drying, there is obtained a green dyeing of good fastness to wet processing, rubbing and light.

Clear green shades of good fastness properties are also obtained on materials of cellulose by one of the other dyeing or printing methods described in Examples 1 to 3, 18 and 30.

EXAMPLE 68

0.1 Mole of the paste of the aminoazo compound of the formula

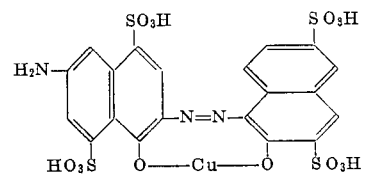

which is obtained by coupling the diazonium compound of 6-acetamino-2-aminonaphthalene-4,8-disulphonic acid with 2-hydroxy-naphthalene-3,6-disulphonic acid, hydrolysis and conversion of the monoazo compound into the copper complex, is dissolved in 2,000 parts by volume of water at pH 6.5 and combined with 20 parts by weight 2,4,6-trifluoro-5-chloro-pyrimidine. The reaction mixture is stirred at 20° – 30° C. until the condensation is completed, the pH of the reaction solution being maintained at 6 – 7 by the addition of a sodium carbonate solution. When the reaction is completed, the dyestuff is salted out, isolated and dried in a vacuum.

The dried dyestuff is a dark powder which dissolves in water to give a violet color and dyes cotton in the presence of alkali in bluish violet shades.

EXAMPLE 69

An aqueous solution of 0.1 Mole of the copper complex of the formula

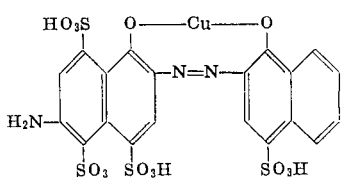

prepared according to the instructions of German Patent Specification Nos. 1,061,460 or 1,085,988, is reacted in the usual manner with 22 parts by weight, 2,4,6-trifluoro-5-chloropyrimidine. A pH of 6 – 7 is maintained by the addition of sodium carbonate and when the reaction is completed, the dyestuff is isolated by salting out. In the dry state the dyestuff is a dark powder which dissolves in water to give a violet color. Cotton fabric is dyed in violet shades fast to light and wet processing.

EXAMPLE 70

27.5 Parts of the sodium salt of 2-methylamino-5-hydroxynaphthalene-7-sulphonic acid are dissolved in 150 parts of water, 20 parts 2,4,6-trifluoro-5-chloropyrimidine are added and the mixture is stirred at 30° C., while continuously neutralizing the hydrogen fluoride formed to pH 6 – 7 by means of a total of 34 parts by volume of a 16 percent sodium carbonate solution. After a short time, the acylation is completed, the pH is 6 and changes no more.

Thirty Parts sodium bicarbonate are then added, and a diazo suspension from 34 parts of the disodium salt of 2-aminonaphthalene-1,7-disulphonic acid in 200 parts of water is added dropwise at 20° C. within 15 minutes. The orange-colored reactive dyestuff of the formula

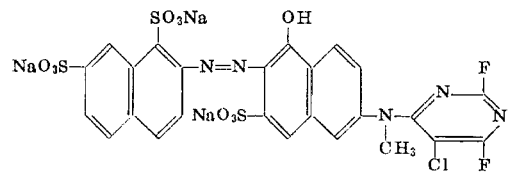

which is immediately formed, is completely separated, after further stirring for 1 hour, by means of 80 parts sodium chloride, filtered off, washed with a dilute sodium chloride solution and dried at 35° C. in a vacuum. The dyestuff dyes cellulose materials by the methods described above in reddish orange shades of very good fastness to wet processing and good fastness to chlorine.

Orange to red reactive dyestuffs are obtained in an analogous manner by acylating the aminonaphthol-sulphonic acids stated in Column 3 of the following Table with 2,4,6-trifluoro-5-chloropyrimidine and coupling the resultant acylamino-naphtholsulphonic acids with the diazo components stated in Column 2.

EXAMPLE 106

56.8 Parts of the diamino-azo dyestuff obtained by coupling diazotized 1-amino-3-acetyl-aminobenzene-6-sulphonic acid with 2-aminonaphthalene-5,7-disulphonic acid in an acetic acid medium and subsequent alkaline or acidic hydrolysis of the acetylamino group, are dissolved at pH 7 in 450 parts of water. After the addition of 20 parts 2,4,6-trifluoro-5-chloropyrimidine, the mixture is stirred at 30° C. for about 1 hour, while continuously neutralizing the liberated hydrofluoric acid to pH 6 – 7 by means of a sodium carbonate solution. When the acylation is completed, the resultant reactive dyestuff which presumably corresponds to the formula

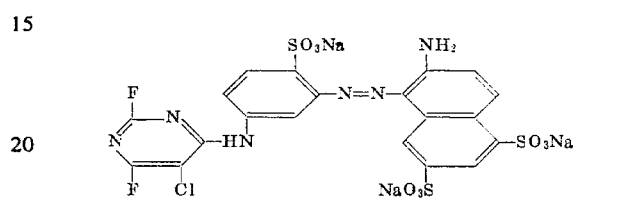

is salted out, filtered off, redissolved in 4,000 parts of water at 30° C., filtered and separated from the filtrate in completely pure form by the addition of 400 parts sodium chloride. The dyestuff is dried as usual at 35° C. in a vacuum. It dyes cellulose materials by one of the methods described above in fast yellowish orange shades.

EXAMPLE 107

A neutral solution of 60 parts of the trisodium salt of the aminoazo dyestuff obtained by coupling diazotized 2-aminonaphthalene-3,6,8-trisulphonic acid with 3-acetylaminoaniline in an acetic acid medium, in 500 parts of water is admixed with 20 parts 2,4,6-trifluoro-5-chloropyrimidine and the mixture is stirred at 30° C. for 1 hour, a pH of 6 being maintained by the continuous addition of a sodium hydroxide solution. The acylation product which is partially precipitated is completely separated at pH 7 by the addition of 100 parts sodium chloride and filtered off. For purification, the reactive dyestuff so obtained can be redissolved in 2,500 parts of water at 30° C., clarified and separated again

| Example number | Diazo component | Aminonaphtholsulphonic acid | Shade on cotton |
|---|---|---|---|
| 71 | 2-aminonaphthalene-1,7-disulphonic acid | 2-ethylamino-5-hydroxy-naphthalene-7-sulphonic acid | Orange. |
| 72 | do | 2-(β-hydroxyethylamino)-5-hydroxynaphthalene-7-sulphonic acid | Do. |
| 73 | do | 2-amino-5-hydroxynaphthalene-7-sulphonic acid | Do. |
| 74 | do | 2-amino-5-hydroxynaphthalene-1,7-disulphonic acid | Do. |
| 75 | do | 2-amino-8-hydroxynaphthalene-6-sulphonic acid | Scarlet. |
| 76 | do | 2-amino-8-hydroxynaphthalene-3,6-disulphonic acid | Do. |
| 77 | 2-aminonaphthalene-1,5-disulphonic acid | 2-methylamino-5-hydroxynaphthalene-7-sulphonic acid | Orange. |
| 78 | do | 2-ethylamino-5-hydroxynaphthalene-7-sulphonic acid | Do. |
| 79 | do | 2-(β-hydroxyethylamino)-5-hydroxynaphthalene-7-sulphonic acid | Do. |
| 80 | do | 2-amino-5-hydroxynaphthalene-7-sulphonic acid | Do. |
| 81 | do | 2-amino-5-hydroxynaphthalene-1,7-disulphonic acid | Do. |
| 82 | do | 2-amino-8-hydroxynaphthalene-6-sulphonic acid | Scarlet. |
| 83 | do | 2-amino-8-hydroxynaphthalene-3,6-disulphonic acid | Do. |
| 84 | 2-aminonaphthalene-1,5,7-trisulphonic acid | 2-amino-5-hydroxynaphthalene-7-sulphonic acid | Orange. |
| 85 | do | 2-methylamino-5-hydroxynaphthalene-7-sulphonic acid | Do. |
| 86 | do | 2-amino-8-hydroxynaphthalene-6-sulphonic acid | Scarlet. |
| 87 | 2-aminobenzene-sulphonic acid | 2-methylamino-5-hydroxynaphthalene-7-sulphonic acid | Orange. |
| 88 | do | 2-(p-hydroxyethylamino)-5-hydroxynaphthalene-7-sulphonic acid | Do. |
| 89 | do | 2-amino-8-hydroxynaphthalene-6-sulphonic acid | Scarlet. |
| 90 | do | 2-amino-8-hydroxynaphthalene-3,6-disulphonic acid | Do. |
| 91 | do | 2-amino-5-hydroxynaphthalene-1,7-disulphonic acid | Orange. |
| 92 | 2-aminonaphthalene-1-sulphonic acid | 1-amino-8-hydroxynaphthalene-3,6-disulphonic acid | Bluish red. |
| 93 | do | 1-amino-8-hydroxynaphthalene-4,6-disulphonic acid | Do. |
| 94 | 2-aminonaphthalene-1,5-disulphonic acid | 1-amino-8-hydroxynaphthalene-3,6-disulphonic acid | Do. |
| 95 | do | 1-amino-8-hydroxynaphthalene-4,6-disulphonic acid | Do. |
| 96 | do | 1-amino-8-hydroxynaphthalene-6-sulphonic acid | Bluish red. |
| 97 | 2-aminonaphthalene-1,7-disulphonic acid | 1-amino-8-hydroxynaphthalene-3,6-disulphonic acid | Do. |
| 98 | do | 1-amino-8-hydroxynaphthalene-4,6-disulphonic acid | Do. |
| 99 | do | 1-amino-8-hydroxynaphthalene-6-sulphonic acid | Do. |
| 100 | 2-aminonaphthalene-1,5,7-trisulphonic acid | 1-amino-8-hydroxynaphthalene-3,6-disulphonic acid | Do. |
| 101 | 1-amino-4-chlorobenzene-2-sulphonic acid | 1-amino-8-hydroxynaphthalene-3,6-disulphonic acid | Do. |
| 102 | 1-amino-2-methoxy-benzene-5-sulphonic acid | 1-amino-8-hydroxynaphthalene-3,6-disulphonic acid | Do. |
| 103 | 1-amino-benzene-2-carboxylic acid-4-sulphonic acid | 1-amino-8-hydroxynaphthalene-3,6-disulphonic acid | Bluish red. |
| 104 | 1-amino-4-acetyl-aminobenzene-2-sulphonic acid | do | Violet. |
| 105 | do | 1-amino-8-hydroxynaphthalene-4,6-disulphonic acid | Bluish red. | by salting out the filtrate with 350 parts sodium chloride. The dyestuff has the formula

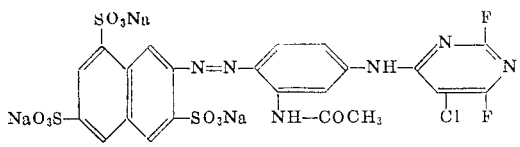

after filtering off, drying at 35° C. and grinding, it is a yellow powder which readily dissolves in water to give a yellow color and dyes cellulose fibers by one of the dyeing methods described above in the presence of acid-binding agents in very fast reddish yellow shades. Fast yellow shades are also obtained on wool and polyamide fibers.

Similar dyestuffs are obtained by following the procedure described above but replacing the 60 parts of the sodium salt of 4'-amino-2'-acetylamino-phenyl-(1')-azonaphthalene-(2)-3,6,8-trisulphonic acid with corresponding amounts of the aminoazo dyestuffs obtained from the amino compounds stated in Column 2 and the coupling components stated in Column 3 in the usual manner by diazotization and coupling in an acetic acid medium, and acylating with 2,4,6-trifluoro-5-chloropyrimidine.

| Ex. No. | Diazo component | Coupling component | Shade on cotton |
|---|---|---|---|
| 108 | 2-aminonaphthalene-1,5-disulphonic acid | 1-amino-3-methyl-6-methoxybenzene | strongly reddish yellow |
| 109 | " | 1-amino-3-methyl-benzene | yellow |
| 110 | " | 1-aminonaphthalene-6-sulphonic acid | reddish yellow |
| 111 | " | 1-amino-3-acetyl-aminobenzene | reddish yellow |
| 112 | " | 3-aminophenyl-urea | reddish yellow |
| 113 | " | 1-amino-3-hydroxy-acetyl-aminobenzene | reddish yellow |
| 114 | 2-aminonaphthalene-5,7-disulphonic acid | 1-amino-3-methyl-6-methoxybenzene | strongly reddish yellow |
| 115 | " | 1-aminonaphthalene-7-sulphonic acid | reddish yellow |
| 116 | " | 1-amino-3-acetyl-aminobenzene | reddish yellow |
| 117 | " | 3-aminophenyl-urea | reddish yellow |
| 118 | " | 1-amino-3-hydroxyacetyl-aminobenzene | reddish yellow |
| 119 | 1-aminonaphthalene-3,7-disulphonic acid | 1-amino-3-methyl-6-methoxybenzene | strongly reddish yellow |
| 120 | " | 1-amino-3-methyl-benzene | reddish yellow |
| 121 | 1-aminonaphthalene-3,7-disulphonic acid | 1-aminonaphthalene-6-sulphonic acid | reddish yellow |
| 122 | 2-aminonaphthalene-3,6-disulphonic acid | 1-amino-3-methyl-benzene | reddish yellow |
| 123 | " | 1-amino-3-methyl-6-methoxybenzene | strongly reddish yellow |
| 124 | " | 1-amino-3-acetylamino-benzene | reddish yellow |
| 125 | " | 3-aminophenyl-urea | reddish yellow |
| 126 | " | 1-amino-3-hydroxyacetyl-aminobenzene | reddish yellow |
| 127 | " | 1-aminonaphthalene-6-sulphonic acid | reddish yellow |
| 128 | 2-aminonaphthalene-6,8-disulphonic acid | 1-amino-3-acetylamino-benzene | reddish yellow |
| 129 | " | 1-amino-2-methoxynaphthalene-6-sulphonic acid | strongly reddish yellow |
| 130 | " | 1-aminonaphthalene-6-sulphonic acid | reddish yellow |
| 131 | 2-aminonaphthalene-4,8-disulphonic acid | 1-aminonaphthalene-6-sulphonic acid | yellow |
| 132 | " | 1-aminonaphthalene-7-sulphonic acid | yellow |
| 133 | " | 1-amino-2-methoxynaphthalene-6-sulphonic acid | strongly reddish yellow |
| 134 | " | 1-methylamino-3-methylbenzene | yellow |
| 135 | 2-aminonaphthalene-4,8-disulphonic acid | 1-ethylamino-3-methylbenzene | yellow |
| 136 | " | N-methyl-aniline | yellow |
| 137 | " | N-ethylaniline | yellow |
| 138 | " | N-(β-hydroxyethyl)-aniline | yellow |
| 139 | 2-aminonaphthalene-4,8-disulphonic acid | N-butyl-aniline | yellow |
| 140 | 2-aminonaphthalene-3,6,8-trisulphonic acid | aniline | reddish yellow |
| 141 | " | 1-amino3-methylbenzene | reddish yellow |
| 142 | " | 3-aminophenyl-urea | reddish yellow |
| 143 | " | 1-amino-3-hydroxyacetyl-aminobenzene | reddish yellow |
| 144 | " | 1-amino-3-acetylamino-6-methoxybenzene | yellowish orange |
| 145 | "1-amino3- | acetylamino-6-methylbenzene | reddish yellow |
| 146 | "1-amino3- | methane-sulphonylaminobenzene | reddish reddish yellow |
| 147 | " | 2,5-dimethoxyaniline | yellowish orange |
| 148 | " | 3-methyl-6-methoxy-aniline | yellowish orange |
| 149 | " | N-methyl-aniline | reddish yellow |
| 150 | " | N-ethyl-aniline | reddish yellow |
| 151 | " | N-butyl-aniline | reddish yellow |
| 152 | " | N-(β-hydroxyethyl)-aniline | reddish yellow |
| 153 | " | 3-(N-ethylamino)-toluene | reddish yellow |
| 154 | " | 2-aminotoluene | reddish yellow |
| 155 | " | 1-amino-2,5-dimethyl-benzene | strongly reddish yellow |
| 156 | " | 1-amino-2-methoxy-benzene | strongly reddish yellow |
| 157 | " | 1-amino-3-methoxy-benzene | reddish yellow |
| 158 | " | 1-ethylamino-3-methoxybenzene | reddish yellow |
| 159 | " | 1-aminonaphthalene-6-sulphonic acid | reddish yellow |
| 160 | 2-aminonaphthalene-3,6,8-trisulphonic acid | 1-aminonaphthalene-7-sulphonic acid | reddish yellow |
| 161 | 2-aminonaphthalene-4,6,8-trisulphonic acid | 1-amino-3-methyl-benzene | reddish yellow |
| 162 | " | 1-amino-3-acetyl-aminobenzene | reddish yellow |
| 163 | 1-aminonaphthalene-2,4,7-trisulphonic acid | 1-amino-3-methyl-benzene | yellow |
| 164 | " | 1-aminonaphthalene-6-sulphonic acid | yellow |
| 165 | 4-nitro-4'-amino-stilbene-2,2'-disulphonic acid | 1-amino-3-acetyl-aminobenzene | reddish yellow |
| 166 | " | 3-aminophenyl-urea | reddish yellow |
| 167 | " | 1-amino-3-hydroxyacetyl-aminobenzene | reddish yellow |
| 168 | " | N-methyl-aniline | reddish yellow |
| 169 | " | N-ethyl-aniline | reddish yellow |

| | | | |
|---|---|---|---|
| 170 | " | N-butyl-anilaniline | reddish yellow |
| 171 | " | N-(β-hydroxyethyl)-aniline | reddish yellow |
| 172 | " | 1-(N-ethylamino)-3-methylbenzene | reddish yellow |
| 173 | Aniline-2,5-disulphonic acid | 1-aminonaphthalene-6-sulphonic acid | reddish yellow |
| 174 | " | 1-aminonaphthalene-7-sulphonic acid | reddish yellow |
| 175 | " | 1-amino-3-methylbenzene | yellow |
| 176 | " | 1-amino-3-acetylaminobenzene | yellow |
| 177 | " | 1-amino-2-methoxy-5-methylbenzene | reddish yellow |
| 178 | " | 1-amino-2,5-dimethoxybenzene | reddish yellow |
| 179 | Aniline-2,4-disulphonic acid | 1-amino-2-methoxy-5-methylbenzene | reddish yellow |

EXAMPLE 180

Sixty five Parts of the dyestuff of the formula

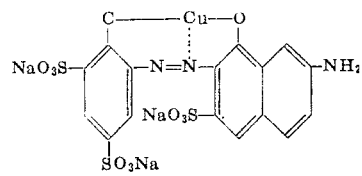

(prepared by coupling diazotized 1-hydroxy-2-aminobenzene-4,6-disulphonic acid with 2-amino-8-hydroxynaphthalene-6-sulphonic acid and coppering the resultant azo dyestuff) are dissolved neutral in 700 parts of water. Twenty Parts 2,4,6-trifluoro-5-chloropyrimidine are added and the mixture is stirred at 20° – 30° C., while continuously neutralizing the liberated acid to pH 6 – 7 by means of a sodium carbonate solution, until free amino groups can no longer be detected. The resultant reactive dyestuff of the formula

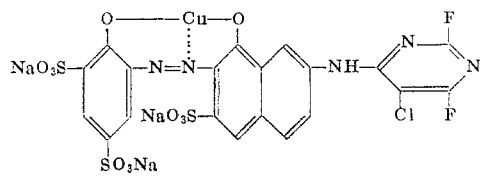

is salted out, filtered off, washed and dried at 30° –40° C. The dyestuff dyes cellulose materials by one of the methods described above in very fast ruby shades.

Dyestuffs with similar properties are obtained in analogy with the method described above from the copper complexes of the azo dyestuffs prepared from the diazo and azo components stated in the following Table

EXAMPLE 202

The procedure is as described in Example 30 but the diazotized reactive group-containing intermediate is coupled in a soda-alkaline medium, instead of with 47 parts of the sodium salt of 1-benzoylamino-8-hydroxynaphthalene-3,6-disulphonic acid, with 40 parts of the sodium salt of 1-acetylamino-8-hydroxynaphthalene-3,6-disulphonic acid, and the resultant dyestuff of the formula

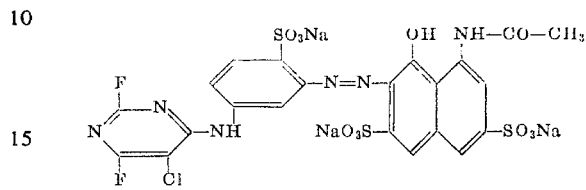

is isolated in the manner described in Example 30. The water-soluble dyestuff dyes cellulose materials by the pad-steaming or pad-thermofixing method (at 140° C.) in bluish red shades which are white dischargeable and fast to rubbing and light.

EXAMPLE 203

A solution of 19.5 parts of the sodium salt of 1-aminobenzene-4-sulphonic acid and 6.9 parts sodium nitrite in 200 parts of water is poured into a mixture of 100 parts of ice and 28 parts by volume of concentrated hydrochloric acid; the reaction mixture is then stirred for one-half hour at 0° – 10° C., and the excess nitrous acid is subsequently removed. The diazo suspension so obtained is admixed at 0° – 10° C. with a cooled and thereby partially crystallized solution of 26.2 parts of the potassium salt of 1-aminonaphthalene-8-sulphonic acid in 250 parts of hot water and the strongly acidic coupling mixture is neutralized at 10° – 20° C. to pH 4 by the careful addition of a sodium hydroxide solution. The coupling is rapidly completed; the aminoazo dyestuff formed is completely salted out with 100 parts sodium chloride, filtered off with suction, washed and redissolved in 500 parts of water at 10° C. and pH 6 – 7. The aqueous solution is mixed dropwise with 20 parts 2,4,6-trifluoro-5-chloropyrimidine and stirred at 20° – 30° C., while continuously neutralizing the liberated acid to pH 6 – 7 by means of a sodium carbonate solution. When the aminoazo dyestuff can no longer be detected, the reactive dyestuff of the formula

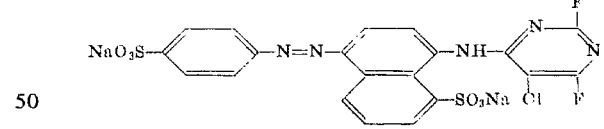

which is partially precipitated, is salted out with 40 parts sodium chloride, filtered off and redissolved in 800 parts of warm

| No. | Diazo component | Coupling component | Shade on cotton |
|---|---|---|---|
| 181 | 1-hydroxy-2-aminobenzene-4-sulphonic acid | 2-methylamino-5-hydroxynaphthalene-7-sulphonic acid | Ruby. |
| 182 | do | 2-ethylamino-5-hydroxynaphthalene-7-sulphonic acid | Do. |
| 183 | do | 2-(p-hydroxyethylamino)-5-hydroxynaphthalene-7-sulphonic acid | Do. |
| 184 | do | 2-amino-8-hydroxynaphthalene-3,6-disulphonic acid | Do. |
| 185 | 1-hydroxy-2-aminobenzene-4,6-disulphonic acid | 2-amino-5-hydroxynaphthalene-1,7-disulphonic acid | Do. |
| 186 | do | 2-amino-8-hydroxynaphthalene-3,6-disulphonic acid | Do. |
| 187 | do | 2-methylamino-5-hydroxynaphthalene-7-sulphonic acid | Do. |
| 188 | do | 2-ethylamino-5-hydroxynaphthalene-7-sulphonic acid | Do. |
| 189 | do | 2-(p-hydroxyethylamino)-5-hydroxynaphthalene-7-sulphonic acid | Do. |
| 190 | 1-hydroxy-2-aminobenzene-4,6-disulphonic acid | 1-amino-8-hydroxynaphthalene-3,6-disulphonic acid | Violet. |
| 191 | do | 1-amino-8-hydroxynaphthalene-4,6-disulphonic acid | Do. |
| 192 | 1-hydroxy-2-aminobenzene-5-sulphonic acid | 1-amino-8-hydroxynaphthalene-3,6-disulphonic acid | Do. |
| 193 | do | 1-amino-8-hydroxynaphthalene-4,6-disulphonic acid | Do. |
| 194 | 1-hydroxy-2-amino-4-acetylaminobenzene-6-sulphonic acid | 1-amino-8-hydroxynaphthalene-3,6-disulphonic acid | Bluish violet. |
| 195 | 1-hydroxy-2-amino-4-acetylaminobenzene-6-sulphonic acid [1] | 1-ethoxy-8-hydroxynaphthalene-3,6-disulphonic acid | Do. |
| 196 | do | 1-amino-8-hydroxynapthalene-2,4-disulphonic acid [2] | Blue. |
| 197 | do | 1-amino-8-hydroxynaphthalene-2,4,6-trisulphonic acid | Do. |
| 198 | 1-hydroxy-2-amino-6-acetylaminobenzene-4-sulphonic acid [2] | 1-amino-8-hydroxynaphthalene-2,4-disulphonic acid | Do. |
| 199 | 1-amino-2-hydroxy-6-nitronaphthalene-4-sulphonic acid [3] | do | Do. |
| 200 | 1-amino-2-hydroxy-6-nitronaphthalene-4-sulphonic acid [4] | 1-amino-8-hydroxynaphthalene-2,4,6-trisulphonic acid [5] | Do. |
| 201 | 1-hydroxy-2-amino-6-acetylaminobenzene-4-sulphonic acid [5] | do | Do. |

[1] (4-positioned acetylamino group subsequently hydrolysed).
[2] (6-positioned acetylamino group hydrolysed).
[3] (6-positioned nitro group subsequently reduced to NH₂).
[4] (6-positioned nitro group subsequently reduced to NH₂).
[5] (6-positioned acetylamino group hydrolysed).

water for purification. After clarification of the solution, the pure dyestuff is separated from the filtrate by the addition of 80 – 100 parts sodium chloride. After filtering off, drying at 35° C. and grinding, there is obtained a yellow powder which readily dissolves in water to give a yellow color and dyes cellulose fibers by one of the dyeing methods described above in the presence of acid-binding agents in yellow shades of very good fastness to wet processing, light and chlorine. Fast yellow dyeings are also obtained on wool and polyamide fibers.

When the procedure described above is followed but, instead of 19.5 parts of the sodium salt of 1-aminobenzene-4-sulphonic acid, equivalent amounts of the diazo components stated in the following Table are coupled with 1-aminonaphthalene-8-sulphonic acid, then valuable yellow to brown reactive dyestuffs are likewise obtained after acylation with 2,4,6-trifluoro-5-chloropyrimidine.

steaming apparatus at 103° to 115° C. for 30 seconds, a bluish red print of good fastness to wet processing, rubbing and light is obtained after rinsing and soaping at the boil.

EXAMPLE 205

A mixture of the solutions of 65.5 parts each of the chromium 2 : 1 complex and the cobalt 2 : 1 complex of the dyestuff of the formula

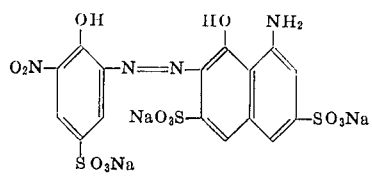

| Diazo component | Shade on cellulose fibres |
| --- | --- |
| 1-aminobenzene-2,5-disulphonic acid | Reddish yellow. |
| 2-amino-naphthalene-4,8-disulphonic acid | Strongly reddish yellow. |
| 2-amino-naphthalene-5,7-disulphonic acid | Do. |
| 2-amino-naphthalene-6,8-disulphonic acid | Do. |
| 2-amino-naphthalene-3,6,8-trisulphonic acid | Do. |
| 2-amino-naphthalene-4,6,8-trisulphonic acid | Do. |
| 4-amino-azobenzene-3,4'-disulphonic acid | Yellowish brown. |
| 4-amino-2-acetylamino-azobenzene-2',5'-disulphonic acid | Orange-brown. |
| 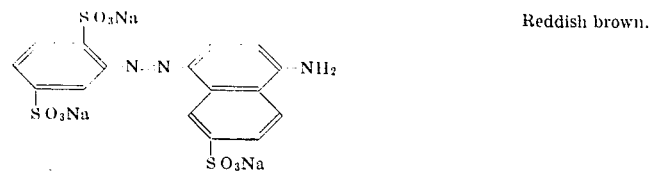 (1-aminobenzene-2,5-disulphonic acid coupled in an acidic medium with 1-amino-naphthalene-6-sulphonic acid) | Reddish brown. |
| 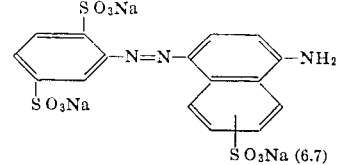 (1-aminobenzene-2,5-disulphonic acid coupled in an acidic medium with the technical mixture of 1-aminonaphthalene-6- and -7-sulphonic acid) | Do. |
| 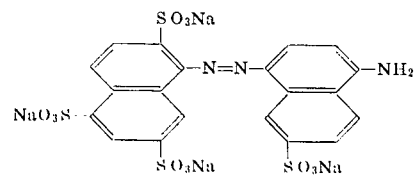 (1-amino-naphthalene-2,5,7-trisulphonic acid coupled in an acidic medium with 1-amino-naphthalene-6-sulphonic acid) | Violet-tinted brown. |
| 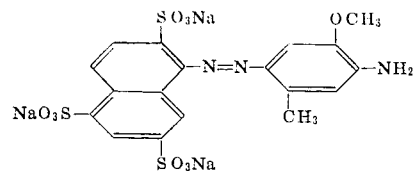 (1-amino-naphthalene-2,5,7-trisulphonic acid coupled in an acidic medium with 1-amino-2-methoxy-5-methylbenzene) | Reddish brown. |

EXAMPLE 204

When a cellulose fabric is printed with a printing paste which contains, per kilogram, 30 g of the dyestuff described in Example 18, 100 g urea, 300 g of water, 500 g of alginate thickening agent (60 g sodium alginate per kilogram thickening agent), 10 g sodium carbonate and 10 g of the sodium salt of 3-nitrobenzene-sulphonic acid and which has been made up with water to 1 kilogram, the fabric is subsequently subjected to an intermediate drying and then steamed in a suitable each in 400 parts of water, is stirred with 40 parts 2,4,6-trifluoro-5-chloropyrimidine at 30° – 40° C. for about 2 hours while maintaining a pH of 6 – 7. When no more aminoazo dyestuff can be detected by chromatography (Co-complex: blue; Cr-complex: blue-green), the resultant mixture of the two reactive dyestuffs is salted out with potassium chloride, filtered off and dried.

The dyestuff yields on cellulose materials by the pad-dyeing processes or when printed in the presence of acid-binding agents, intense black shades of very good fastness to wet processing and light.

Valuable black dyestuffs are also obtained by proceeding analogously but using a mixture of the chromium 2 : 1 and cobalt 2 : 1 complexes of the following aminoazo dyestuffs:

| Diazo component | Coupling component | Coupling pH |
|---|---|---|
| 1-hydroxy-2-amino-4-nitrobenzene | 1-hydroxy-8-amino-naphthalene-3,6-disulphonic acid | 9 |
| 1-hydroxy-2-amino-4-nitronaphthalene-7-sulphonic acid | " | 9 |

EXAMPLE 206

A neutral solution of 53.15 parts of the disodium salt of the aminoazo dyestuff obtained by coupling diazotized 1-amino-4-nitrobenzene-2-sulphonic acid with 1-(2'-chloro-5'-sulphophenyl)-3-methyl-pyrazolone-(5) and subsequent reduction of the nitro group with sodium sulphide, in 300 parts of water is admixed with 20 parts 2,4,6-trifluoror-5-chloropyrimidine, and the mixture is stirred at 30° C. for 1 hour while the liberated acid is continuously neutralized to a pH value of 6.0 by means of a sodium carbonate solution. The precipitated dyestuff of the formula

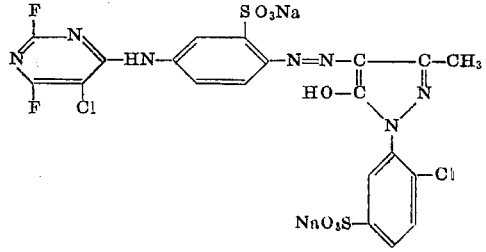

is filtered off, dissolved warm at pH 6 – 7 in 3000 parts of water, and reprecipitated from the filtered solution by the addition of sodium chloride. After filtering off, drying and pulverizing, there is obtained a yellow powder which is readily water-soluble and dyes cellulose materials from a long bath at 30° C. or by the cold batch padding process with sodium carbonate as acid-binding agent in clear yellow shades fast to washing, rubbing and light.

Valuable new reactive dyestuffs are also obtained by following the procedure described above, but replacing the aminoazo dyestuff there used with equivalent amounts of the aminoazo dyestuffs synthetized from the components stated in the following Table.

In the Table the term "hydrolyzed" means that an acylamino group contained in the aminoazo dyestuff was subsequently hydrolyzed, while the term "reduced" indicates that a nitro group contained in the diazo component is reduced after the coupling to the amino group, whereby the desired aminoazo dyestuff is formed.

| Example No. | Diazo component | Azo component | pH of coupling medium | Shade on cellulose |
|---|---|---|---|---|
| 207 | 1-amino-4-nitrobenzene-2-sulphonic acid [1] | 1-(4'-sulphophenyl)-3-methyl-pyrazolone-(5) | 5–6 | Yellow. |
| 208 | do | 1-(4'-sulphonphenyl)-3-carboxy-pyrazolone-(5) | 5–6 | Reddish yellow. |
| 209 | do | 1-(3'-sulphophenyl)-3-methyl-5-aminopyrazole | 6–7 | Yellow. |
| 210 | 1-amino-3-acetylaminobenzene-6-sulphonic acid [2] | do | 6–7 | Do. |
| 211 | do | 1-(β-hydroxyethyl)-3-methyl-pyrazolone-(5) | 5–6 | Do. |
| 212 | 2 moles 1-amino-3-acetyl-aminobenzene-6-sulphonic acid (hydrolysed) | 1 mole bis-pyrazolone from 4,4'-bis-hydrazino-dibenzyl-2,2'-disulphonic acid and acetoacetic ethyl ester) | 5–6 | Do. |
| 213 | 1 mole 1-amino-3-acetyl-aminobenzene-6-sulphonic acid (hydrolysed) | 1-(4'-sulphophenyl)-3-carboxy-pyrazolone-(5) | 5–6 | Do. |
| 214 | 1-amino-5-acetylaminonaphthalene-3,7-disulphonic acid (hydrolysed) | 1-(4'-sulphophenyl)-3-carboxy-pyrazolone-(5) | 5–6 | Reddish yellow. |
| 215 | 1-amino-2-methylbenzene-4,6-disulphonic acid | 2-acetylamino-5-naphthol-7-sulphonic acid (hydrolysed) | 7–8 | Orange. |
| 216 | do | 2-acetylamino-8-naphthol-6-sulphonic acid (hydrolysed) | 7–8 | Red. |
| 217 | 1-amino-2-methylbenzene-4,6-disulphonic acid | 1-chloro-2-acetylamino-5-naphthol-7-sulphonic acid (hydrolysed) | 7–8 | Orange. |
| 218 | 1-aminobenzene-2-sulphonic acid | 1-acetylamino-8-hydroxy-naphthalene-4,6-disulphonic acid (hydrolysed) | 7–8 | Red. |
| 219 | 2-aminonaphthalene-3,6-disulphonic acid | do | 7–8 | Bluish-red. |
| 220 | 2-aminonaphthalene-3,7-disulphonic acid | do | 7–8 | Do. |
| 221 | 2-aminonaphthalene-4,8-disulphonic acid | do | 7–8 | Do. |
| 222 | 2-aminonaphthalene-3,6-disulphonic acid | 1-acetylamino-8-hydroxynaphthalene-3,6-disulphonic acid (hydrolysed) | 7–8 | Do. |
| 223 | 2-aminonaphthalene-4,8-disulphonic acid | 1-acetylamino-8-hydroxynaphthalene-3,6-disulphonic acid (hydrolysed) | 7–8 | Do. |
| 224 | 1-amino-4-methoxybenzene-2-sulphonic acid | 2-(N-acetyl-N-methylamino)-5-hydroxynaphthalene-7-sulphonic acid (hydrolysed) | 7–8 | Yellowish red. |
| 225 | do | 2-(N-acetyl-N-methylamino)-8-hydroxynaphthalene-6-sulphonic acid (hydrolysed) | 7–8 | Red. |
| 226 | 1-aminobenzene-2-sulphonic acid | 2-(N-acetyl-N-methylamino)-8-hydroxynaphthalene-6-sulphonic acid (hydrolysed) | 7–8 | Red. |
| 227 | 1-aminobenzene-3-sulphonic acid | do | 7–8 | Red. |
| 228 | 1-aminobenzene-4-sulphonic acid | do | 7–8 | Red. |
| 229 | 1-amino-4-methylbenzene-2-sulphonic acid | do | 7–8 | Red. |
| 230 | 1-amino-2,4-dimethylbenzene-6-sulphonic acid | 2-(N-acetyl-N-methylamino)-8-hydroxynaphthalene-6-sulphonic acid (hydrolysed) | 7–8 | Red. |
| 231 | do | 2-acetylamino-8-hydroxynaphthalene-6-sulphonic acid (hydrolysed) | 7–8 | Red. |
| 232 | do | 2-acetylamino-8-hydroxynaphthalene-3,6-disulphonic acid (hydrolysed) | 7–8 | Red. |
| 233 | 4-aminoazobenzene-3,4'-disulphonic acid | 1-amino-3-acetylaminobenzene | 5–6 | Yellow-brown. |
| 234 | do | 1-amino-3-hydroxyacetylaminobenzene | 5–6 | Do. |
| 235 | do | 1-amino-naphthalene-6-sulphonic acid | 5–6 | Do. |
| 236 | do | 1-amino-naphthalene-7-sulphonic acid | 5–6 | Do. |
| 237 | do | 1-amino-2-(4'-amino-2'-sulphophenyl-(1')-azo)-8-hydroxy-naphthalene-3,6-disulphonic acid | 8 | Black. |

[1] (4-positioned nitro group subsequently reduced.)
[2] (3-positioned acetylamino group subsequently hydrolysed.)

EXAMPLE 238

52.4 Parts of the disodium salt of 4-([4''-amino-phenyl]-amino)-2'-nitro-diphenylamine-3,4'-disulphonic acid are dissolved in 1000 parts of water and stirred with 20 parts 2,4,6-trifluoro-5-chloropyrimidine at 20° – 30° C. for 1 hour. The liberated acid is continuously neutralized to a pH value of 5.5 – 6 by means of sodium carbonate. The resultant reactive nitro dyestuff of the formula

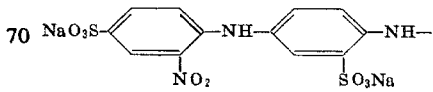
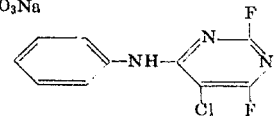

is salted out, filtered off, washed and dried. It dyes cellulose fibers from a long bath or by one of the usual padding methods in the presence of sodium carbonate as acid-binding agent in deep violet-brown shades fast to wet processing and rubbing.

EXAMPLE 239

Fifty two Parts 1-amino-4-(4'-N-methylaminomethylanilino)-anthraquinone-2,2'-disulphonic acid are dissolved in 550 parts of water and the solution is adjusted to pH 6 by means of a sodium hydroxide solution. Eighteen Parts 2,4,6-trifluoro-5-chloropyrimidine are then added dropwise at room temperature and a pH of 6 is maintained by means of a 2N sodium carbonate solution. The reaction is observed chromatographically. The reaction product which crystallizes in the form of blue needles is filtered off with suction and the filter residue washed with a 3 percent sodium chloride solution. Clear blue dyeings of good fastness to wet processing and good fastness to light are obtained on cotton.

The dyestuff obtained presumably corresponds to the formula

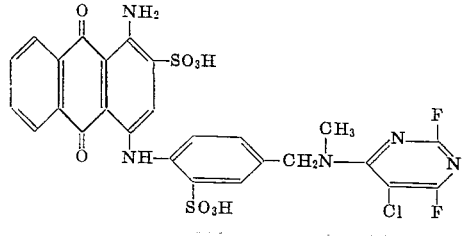

with the diazo compound from 17.5 parts 2-amino-benzenesulphonic acid, with the diazo compound from 20.8 parts 3-chloroaniline-6-sulphonic acid in the presence of 12 parts sodium carbonate at a final pH of 7, then there is obtained a reactive dyestuff of the formula

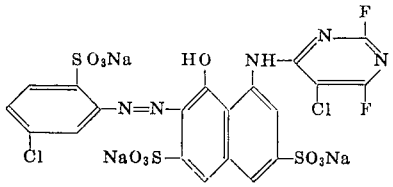

with which cellulose materials can be dyed or printed from a long bath at 40° C. or by one of the padding or printing methods customary for reactive dyestuffs with sodium carbonate as acid-binding agents in brilliant red shades fast to wet processing.

In an analogous manner there are obtained from the coupling components stated in the following Table, by acylation of their amino group with 2,4,6-trifluoro-5-chloropyrimidine and coupling of the resultant dyestuff inter-

| Example No. | Water-soluble amino-anthraquinone derivative | Shade |
|---|---|---|
| 240 | 1-amino-4-(4'-N-methylaminomethylanilino)-anthraquinone-2,6,2'-trisulphonic acid | Greenish blue. |
| 241 | 1-amino-4-(4'-N-methylaminomethylanilino)-anthraquinone-2,5,8-trisulphonic acid | Do. |
| 242 | 1-amino-4-(4'-N-methylaminomethylanilino)-anthraquinone-2,8-disulphonic acid | Do. |
| 243 | 1-amino-4-(4'-aminoanilino)-anthraquinone-2,6-disulphonic acid | Blue. |
| 244 | 1-amino-4-(4'-aminoanilino)-anthraquinone-2,5-disulphonic acid | Blue-green. |
| 245 | 1-amino-4-(3'-aminoanilino)-anthraquinone-2,6-disulphonic acid | Greenish blue. |
| 246 | 1-amino-4-(3'-aminoanilino)-anthraquinone-2,5-disulphonic acid | Blue. |
| 247 | 1-amino-4-(3'-aminoanilino)-anthraquionne-2,4'-disulphonic acid | Do. |
| | | Somewhat reddish blue. |
| 248 | 1-amino-4-(3'-aminoanilino)-anthraquinone-2,4'-6'-trisulphonic acid | Reddish blue. |
| 249 | 1-amino-4-(4'-aminocyclohexylamino)-anthraquinone-2,5,8-trisulphonic acid | Clear blue. |
| 250 | 1-amino-4-(4'-N-methylaminomethylanilino)-anthraquinone-2,3'-disulphonic acid | Blue. |
| 251 | 1-amino-4-(4'-[4''-aminobenzoylamino]-anilino)-anthraquinone-2,5,8-trisulphonic acid | Blue-green. |
| 252 | 1-amino-4-(4'-[4''-aminobenzene-sulphonamido]-anilino)-anthraquinone-2,5,8-trisulphonic acid | Greenish blue. |
| 253 | 1-amino-4-(4''-aminostilbene-amino)-anthraquinone-2,2',2''-trisulphonic acid | Green. |
| 254 | | Clear reddish blue. |

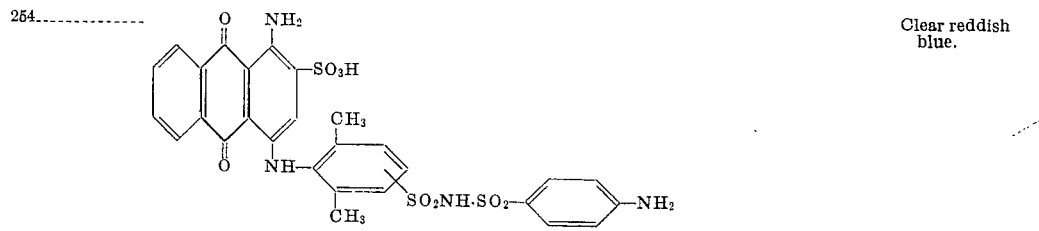

EXAMPLE 255

When proceeding according to the instructions of Example 18, but coupling the resultant dyestuff intermediate, instead of mediates with the stated diazo components, valuable reactive dyestuffs with which cellulose materials can be dyed or printed, preferably in the presence of sodium carbonate, in the stated shades:

| Example number | Diazo component | Coupling component | Coupling pH | Shade |
|---|---|---|---|---|
| 256 | 1-amino-4-methoxybenzene-6-sulphonic acid | 1-amino-8-hydroxynaphthalene-3,6-disulphonic acid | 7-8 | Violet. |
| 257 | do | 1-amino-8-hydroxynaphthalene-4,6-disulphonic acid | 7-8 | Reddish violet. |
| 258 | do | 2-amino-5-hydroxynaphthalene,1,7-disulphonic acid | 7 | Scarlet. |
| 259 | 1-amino-5-chlorobenzene-2-sulphonic acid | do | 7 | Orange. |
| 260 | 1-aminobenzene-3-sulphonic acid | do | 7 | Do. |
| 261 | 1-aminobenzene-4-sulphonic acid | do | 7 | Do. |
| 262 | do | 2-amino-8-hydroxynaphthalene-3,6-disulphonic acid | 7-8 | Scarlet. |
| 263 | 4-aminobenzoic acid-(p-sulphoethyl)-amide | 1-amino-8-hydroxynaphthalene-3,6-disulphonic acid | 7-8 | Red. |
| 264 | 1-amino-4-sulphoacetylamino-benzene-6-sulphonic acid | do | 7-8 | Violet. |
| 265 | 1-amino-3-sulphoacetylamino-benzene-6-sulphonic acid | 2-amino-5-hydroxynaphthalene-1,7-disulphonic acid | 7 | Orange. |
| 266 | 1-amino-4-sulphoacetylaminobenzene | 2-amino-5-hydroxynaphthalene-1,7-disulphonic acid | 7 | Scarlet. |
| 267 | 1-aminobenzene-2,4-disulphonic acid | 1-(2'-methyl-3'-amino-5'-sulphophenyl)-3-methylpyrazolone-(5). | 6 | Yellow. |
| 268 | 2-amino-naphthalene-4,8-disulphonic acid | do | 6 | Do. |

EXAMPLE 269

When proceeding according to the instructions of Example 30, but coupling the dyestuff intermediate obtained from 1,3-diaminobenzene-6-sulphonic acid and 2,4,6-trifluoro-5-chloropyrimidine, after diazotization at 10° C. and pH 7.5 to 6.5 with a solution of 40.5 parts of the disodium salt of 2-sulphoacetylamino-5-hydroxynaphthalene-7-sulphonic acid, then there is obtained a reactive dyestuff of the formula

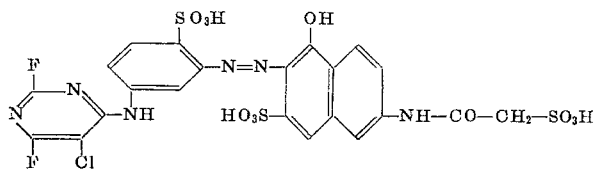

which dyes cellulose materials by one of the usual methods of application with sodium carbonate as acid-binding agent in fast orange shades.

EXAMPLE 270

When the procedure described in Example 206 is followed but, instead of the aminoazo dyestuff there used, 53.15 parts of the disodium salt of the amino azo dyestuff obtained by coupling diazotized 1-amino-4-nitrobenzene-2-sulphonic acid with 1-(2'-chloro-5'-sulphophenyl)-3-methyl-pyrazolone-(5) and subsequent reduction of the nitro group with sodium sulphide, are acylated with 2,4,6-trifluoro-5-chloropyrimidine, then a valuable reactive dyestuff is also obtained, with which cellulose materials can be printed in fast yellow shades by the usual dyeing or printed methods.

Similar reactive dyestuffs are obtained, when, instead of the aminoazo dyestuff mentioned above, one of the aminoazo dyestuffs synthetized from the components stated in the following Table is acylated with 2,4,6-trifluoro-5-chloropyrimidine.

| Example No. | Diazo component | Azo component | Shade |
|---|---|---|---|
| 271 | amino-4-nitro-benzene-2-sulphonic acid (reduced) | 1-(2'-methyl-4'-sulpho-phenyl)-3-methyl-pyrazolone-(5) | yellow |
| 272 | " | 1-(2',5'-disulphophenyl)-3-methyl-pyrazolone-(5) | yellow |
| 273 | " | 1-(2'-methyl-4'-sulpho-6'-chlorophenyl)-3-methyl-pyrazolone-(5) | yellow |
| 274 | 1-amino-4-nitro-benzene-2-sulphonic acid (reduced) | 1-2',5'-dichloro-4'-sulphophenyl)-3-methyl-pyrazolone-(5) | yellow |
| 275 | 1-amino-3-acetyl aminobenzene-6-sulphonic acid (hydrolyzed)D | 1-(2'-methyl-4'-sulphophenyl) 3-methyl-pyrazolone-(5) | greenish yellow |
| 276 | " | 1-4'-sulphophenyl)-3-methyl-pyrazolone-(5) | greenish yellow |
| 277 | " | 1-2'-methyl-4'-sulphophenyl)-3-carboxy-pyrazolone-(5) | greenish yellow |
| 278 | " | 1-(2'-chloro-4'-sulphophenyl)-3-carboxypyrazolone-(5) | greenish yellow |

EXAMPLE 279

Fifty eight Parts of the dyestuff of the formula

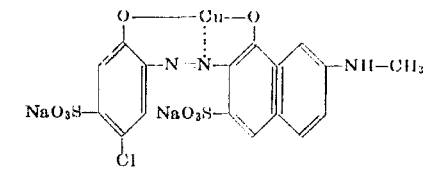

(prepared by coupling diazotized 1-hydroxy-2-amino-4-chloro-benzene-5-sulphonic acid with 2-methylamino-8-hydroxynaphthalene-6-sulphonic acid and coppering the resultant azo dyestuff) are dissolved neutral in 700 parts of water. 20.0 Parts 2,4,6-trifluoro-5-chloro-pyrimidine are added dropwise and the mixture is stirred at 20° – 30° C., while continuously neutralizing the liberated hydrofluoric acid to pH 6.0 – 6.5 by means of a sodium carbonate solution, until free amino groups can no longer be detected. The resultant reactive dyestuff of the formula

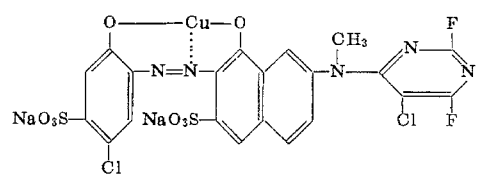

is salted out, filtered off, washed and dried at 30° – 40° C. The dyestuff dyes cellulose materials by one of the methods described above in very fast violet shades.

Dyestuffs with similar properties are obtained in analogy with the method described above from the copper complexes - obtained by simple demethylating or oxidizing coppering - of the mono- and disazo dyestuffs prepared from the diazo and azo components stated in the following Table

| Example No. | Diazo component | Azo component | coupling pH | shade |
|---|---|---|---|---|
| 280 | 1-hydroxy-2-amino-4-chlorobenzene-5-sulphonic acid | 2-amino-8-hydroxy-naphthalene-3,6-disulphonic acid | 10 | reddish violet |
| 281 | " | 1-amino-8-hydroxy-naphthalene-3,6-disulphonic acid | 10 | bluish violet |
| 282 | 2-amino-naphthalene-4,6,8-trisulphonic acid (coppered with oxidation) | 2-hydroxy-6-acetylamino-naphthalene-4-sulphonic acid (hydrolyzed) | 8–9 | reddish blue |
| 283 | 1-2-hydroxy-6-nitronaphthalene-4-sulphonic acid (reduced) | 1-hydroxy-8-ethoxy-naphthalene-3,6-disulphonic acid | 10 | blue |
| 284 | 1-hydroxy-2-amino-benzene-4,6-disulphonic acid | 2-hydroxy-3-amino-naphthalene-5,7-disulphonic acid | 10 | red |
| 285 | 2-amino-naphthalene-4,8-disulphonic acid (coppered with oxidation) | " | 8–9 | blue |
| 286 | 2-aminonaphthalene-4,6,8-trisulphonic acid (coppered with oxidation) | 2-hydroxy-3-amino-naphthalene-7-sulphonic acid | 8–9 | blue |
| 287 | 3-methoxy-4-amino-6-methyl-azobenzene-2',4'-disulphonic acid (coppered with demethylation) | 2-methylamino-5-hydroxynaphthalene-7-sulphonic acid | 10 | navy blue |
| 288 | " | 2-amino-8-hydroxyl-naphthalene-3,6-disulphonic acid | 10 | " |
| 289 | " | 2-amino-5-hydroxy-naphthalene1,7-disulphonic acid | 10 | " |
| 290 | 3-methoxy-4-amino-6-methyl-azobenzene-2',5'-disulphonic acid (coppered with demethylation) | 2-methylamino-5-hydroxynaphthalene-7-sulphonic acid | 10 | " |

| 291 | 3-methoxy-4-amino-6-methyl-azobenzene-2',5'-disulphonic acid (coppered with demethylation) | 2-amino-8-hydroxy-naphthalene-3,6-disulphonic acid | 10 | navy blue |
| --- | --- | --- | --- | --- |
| 292 | " | 2-amino-5-hydroxy-naphthalene-1,7-disulphonic acid | 10 | " |

EXAMPLE 293

62.0 Parts of the trisodium salt of the dyestuff obtained by soda-alkaline coupling of diazotized 4-chloro-2-amino-1-hydroxybenzene with 1-amino-8-hydroxynaphthalene-3,6-disulphonic acid are mixed in 300 parts of water at 70° – 80° C. and a pH of 8 – 9 with 54.2 parts of the 1 : 1 chromium complex of the dyestuff obtained from 6-nitro-1-diazo-2-hydroxynaphthalene-4-sulphonic acid and 2-hydroxynaphthalene. A deep blue solution has formed after 10 minutes.

The mixed complex is acylated within about 1 hour at 30° – 40° C. and a pH of 6.5 – 7.5 with 20 parts 2,4,6-trifluoro-5-chloropyrimidine. During this operation the pH value is kept constant by the dropwise addition of a sodium carbonate solution. The acylated dyestuff is separated by means of 20 percent sodium chloride, filtered off with suction and dried at 30° C.

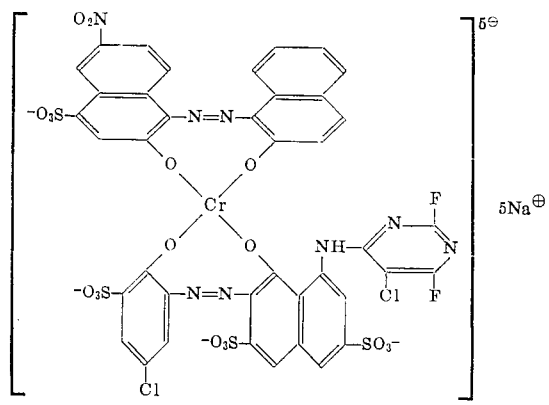

A blue-black print of excellent fastness to light and washing is obtained on cotton by the method described in Example 3.

EXAMPLE 294

30.4 Parts 2-amino-8-hydroxynaphthalene-3,6-disulphonic acid are dissolved neutral in 300 parts of water, the solution is heated to 60° – 65° C. and 20 parts 2,4,6-trifluoro-5-chloropyrimidine are added. Forty Parts of a 15 percent sodium carbonate solution are added in the course of one hour so that the pH is 6 – 6.5. The acylation product is partially precipitated.

A diazonium salt solution freshly prepared from 13.6 parts p-aminobenzyl-sulphonic acid is added dropwise at 0° – 5° C. to the suspension of the acylation product which has been mixed with 12.5 parts sodium carbonate. After further stirring at ice bath temperature for 5 hours, the product is salted out with sodium chloride, filtered off with suction, washed with a dilute sodium chloride solution and dried at 30° C. in a vacuum drying cabinet. The dyestuff obtained corresponds to the formula

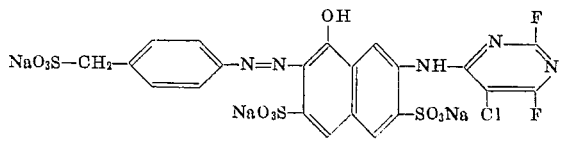

By proceeding as described above, but acylating, instead of 30.4 parts 2-amino-8-hydroxynaphthalene-3,6-disulphonic acid, 30.4 parts 2-amino-5-hydroxynaphthalene-1,7-disulphonic acid with 2,4,6-trifluoro-5-chloropyrimidine and coupling the reactive group-containing coupling component with diazotized p-aminobenzyl-sulphonic acid, a reactive dyestuff is obtained which is readily soluble and dyes fabrics containing cellulose fibers in brilliant reddish orange shades.

A cotton or staple fiber fabric is impregnated on a foulard at 20° – 25° C. with a solution containing, per liter of liquor, 30 g of the dyestuff described in Paragraph 1 of the present Example, 100 g urea and 20 g sodium carbonate, the fabric is squeezed to a moisture content of about 100 percent and the moist fabric is rolled up again. After standing at room temperature for 4 hours, the fabric is rinsed, soaped at the boil in the usual manner and dried. A brilliant scarlet dyeing of good fastness to wet processing and light is obtained.

A cotton or staple fiber fabric is impregnated on a foulard at 20° – 25° C. with a solution containing, per liter of liquor, 30 g of the dyestuff described in Paragraph 1 of the present Example, 100 g urea and 20 g of sodium carbonate, the fabric is squeezed to a moisture content of about 100 percent and steamed at 103° C. for 30 seconds. After rinsing, soaping at the boil and drying, a brilliant scarlet dyeing of good fastness to wet processing and light is likewise obtained.

A cotton fabric is impregnated with a solution at 20° – 25° C. containing, per liter of liquor, 20 g of the dyestuff obtainable according to Paragraph 1 of the present Example and 0.5 g of a non-ionic wetting agent (e.g. a polyethoxylated oleyl alcohol) as well as 150 g urea and 15 g sodium bicarbonate. The fabric is subsequently squeezed between two rubber rollers to a moisture content of about 100 percent. After an intermediate drying at 50° – 60° C., the fabric is heated at 140° C. for 10 minutes and the dyeing so obtained is thoroughly rinsed with hot water and treated at the boil for 10 minutes with a solution containing, per liter 5 g of Marseilles soap and 2 g sodium carbonate. After rinsing and drying, there is obtained an intense scarlet dyeing of good fastness to wet processing and light.

When a cellulose fabric is printed with a printing paste which contains, per kilogram, 30 g of the dyestuff described in Paragraph 1 of the present Example, 100 g urea, 300 g of water, 500 g of an alginate thickening agent (60 g sodium alginate per kilogram of thickening agent), 10 g sodium carbonate and 10 g of the sodium salt of 3-nitrobenzenesulphonic acid, and which was made up to 1 kilogram with water, the fabric is subsequently subjected to an intermediate drying and then steamed in a suitable steaming apparatus at 103° – 115° C. for 30 seconds, an intense scarlet dyeing of good fastness properties is obtained after rinsing and soaping at the boil.

One hundred Parts of wool are introduced at 40° C. into a bath containing, in 5000 parts of water, 1.5 parts of the dyestuff described in Paragraph 1 of the present Example, as well as 6 parts of 30 percent acetic acid and 0.5 parts of a polyethoxylated stearylamine derivative containing hydroxyl groups. The dyebath is brought to the boil within 30 minutes and dyeing is then performed at the boil for 1 hour. After rinsing and drying, there is obtained a brilliant scarlet dyeing of good fastness to washing, milling and light.

EXAMPLE 295

28.9 Parts 2-amino-1-methylbenzene-3,5-disulphonic acid (monosodium salt) are diazotized and the diazo compound is coupled with 13.7 g 1-amino-2-methoxy-5-methylbenzene in a weakly acidic medium. The resultant monoazo dyestuff is isolated and subsequently diazotized, or also immediately diazotized in solution without isolation, and coupled alkaline with 25.3 parts 2-methylamino-5-hydroxynaphthalene-7-sulphonic acid. The disazo dyestuff obtained is salted out by the addition of sodium chloride, filtered off with suction, and the isolated product is metallized with about 50 parts of crystalline copper sulphate, 40 parts diethanolamine, 50 parts ammonia (d 0.88) at 95° – 100° C. within 5 hours. The dyestuff is isolated from the coppering solution by the addition of salt and careful acidification.

The coppered amino-disazo dyestuff is then acylated in an aqueous solution at pH 6 – 7 and a temperature of 20° – 30° C. with 20 parts 2,4,6-trifluoro-5-chloropyrimidine, the pH value being kept within the stated range by the addition of sodium carbonate. When the acylation is completed, the dyestuff is isolated with sodium chloride and dried at 35° C. In the form of the free sulphonic acid the dyestuff corresponds to the formula

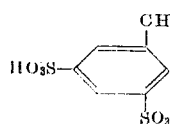
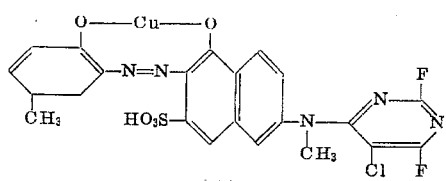

it dyes cellulose fabrics by the methods known for reactive dyestuffs in navy-blue shades fast to wet processing and light.

Other dyestuffs according to the invention can be prepared in a similar manner by combining the above monoazo dyestuff obtained from 2-amino-1-methylbenzene-3,5-disulphonic acid and 1-amino-2-methoxy-5-methylbenzene according to the instructions given above with the aminonaphthol-sulphonic acids stated in the following Table and with 2,4,6-trifluoro-5-chloropyrimidine.

COUPLING COMPONENT 2-amino-5-hydroxynaphthalene-1,7-disulphonic acid 2-amino-8-hydroxynaphthalene-3,6-disulphonic acid.

The resultant dyestuffs have a blue color.

EXAMPLE 296

0.1 Mole 4-ureido-2-amino-1-hydroxybenzene-5-sulphonic acid is diazotized and coupled soda-alkaline with 0.1 mole 1-amino-8-hydroxynaphthalene-2,4-disulphonic acid. The coupling solution is adjusted to a content of 2 moles/liter with caustic soda and then boiled under reflux for 3 hours to hydrolyze the ureido group. After cooling, the mixture is neutralized with hydrochloric acid. The dyestuff is metallized by the addition of 25 parts copper sulphate and 100 parts of a 2N sodium hydroxide solution at 45° C. and a pH value of 4 – 6 and, after 30 minutes, acylated at pH 6 – 7 and temperatures of 20° – 30° C. with 0.1 mole 2,4,6-trifluoro-5-chloropyrimidine. The resultant dyestuff of the formula

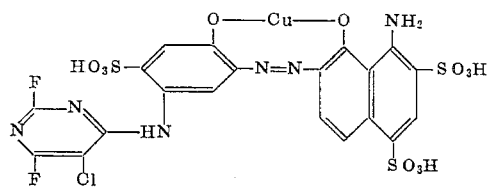

is salted out. A blue dyeing is obtained on cotton.

EXAMPLE 297

A neutral paste of copper-phthalocyanine-3,3',3''-trisulphonic acid chloride, prepared from 600 g of technical 96 percent copper-phthalocyanine, is stirred with a little water, adjusted to 4 liters and reacted at a pH of 3.5 – 60.0 with 216 g N-methyl-N-(4'-amino-2'-sulphobenzyl)-amine, initially at 0° – 3° C. and finally at 20° – 35° C., with the addition of 300 ml (=295 g) pyridine, and the pyridine is subsequently distilled off from the resultant solution of copper-phthalocyanine-disulphonic acid-monosulphonic acid-(3'-sulpho-4'-methyl-aminomethyl-anilide) at pH 9.0 with steam. The solution is brought to 20° – 30° C and 300 g 2,4,6-trifluoro-5-chloro-pyrimidine are added dropwise in portions in the course of 1 to 2 hours, while maintaining a pH of 6 – 7 by the addition of a dilute sodium hydroxide solution. At the same time, the reaction mixture is diluted with water, as required, to such an extent that the dyestuff always remains dissolved.

There are obtained 10 liters of dyestuff solution which is separated from the excess acylating agent, adjusted to pH 7.0 by the addition of acetic acid and reprecipitated by adding 2.5 liters of a concentrated sodium chloride solution with stirring.

After filtering off with suction and drying at 30° C, there is obtained a clear turquoise-blue dyestuff which is fixed on cotton from a soda-alkaline solution at 40° – 60° C. with a very good yield and fastness to washing.

If the NiPc-3,3',3''-trisulphonic acid chloride is used as starting material, then a turquoise blue is obtained which is only slightly more greenish and has equally valuable properties.

EXAMPLE 298

0.1 Mole of the aminoazo dyestuff of the formula

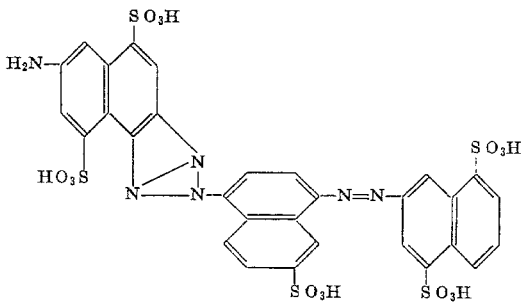

prepared according to the instructions of German Patent specification No. 1,115,865 (application F 27466 IVb/22 a) by coupling the diazonium compound from 2-aminonaphthalene-4,8-disulphonic acid with 1-aminonaphthalene-6-sulphonic acid, further diazotizing the resultant aminoazo dyestuff, coupling with the equivalent amount of 2,5-diaminonapthalene-4,8-disulphonic acid and conversion into the aminotriazole - are dissolved in 1,000 parts by volume of water at pH 6 and mixed at a temperature of 20° – 30° C, while stirring, with 21 parts 2,4,6-trifluoro-5-chloropyrimidine. The hydrofluoric acid which is slowly liberated is neutralized by means of a sodium carbonate solution until the reaction is completed. The dyestuff is subsequently separated by the addition of sodium chloride, isolated and dried at about 50° C. in a vacuum. It is a yellow powder which dissolves in water to give a yellow color.

EXAMPLE 299

38.9 Parts of the dyestuff obtained by soda-alkaline coupling from 6 nitro-2-diazo-1-hydroxybenzene-4-sulphonic acid and 2-hydroxynaphthalene are stirred in 200 parts of water at pH 8 and a temperature of 70° – 80° C. This suspension is admixed with 67.9 parts of the chromium complex compound (containing 1 chromium atom per dyestuff molecule) of the azo dyestuff obtained from 4-chloro-2-diazo-1-hydroxybenzene-6-sulphonic acid and 1-amino-8-hydroxynaphthalene-3,6-disulphonic acid, the pH being kept between 7 and 9 by the dropwise addition of a sodium carbonate solution. A dark-blue solution has formed after 20 minutes at 70° – 80° C. The paper chromatogram shows that a uniform mixed complex has formed. The mixed complex is acylated within 1 hour at 40° C. and pH 6.5 – 7.5 with 22.0 parts 2,4,6-trifluoro-5-chloropyrimidine, the pH being kept within the stated range by the dropwise addition of a sodium carbonate solution. The acylated dyestuff is salted out with 20 percent potassium chloride, filtered off and dried at 30° C. A dark powder is obtained which dissolves in water to give a blue-grey color.

In the form of the pentasodium salt the dyestuff corresponds to the formula

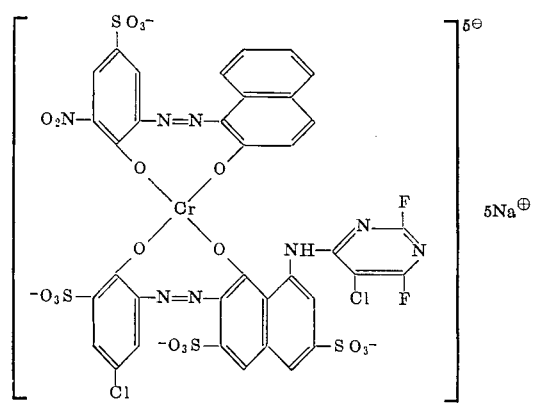

it dyes cotton by the methods described in Examples 1 – 3 in grey to black shades.

Valuable dyestuffs can also be obtained in the manner described in the present Example from the starting components stated in the following Table. For the preparation of these dyestuffs the azo dyestuffs carrying the reactive group in the 2 : 1 mixed complex was always used as 1 : 1 chromium complex.

| Example No. | 1:1 chromium complex | metal free dyestuff | shade on cotton |
|---|---|---|---|
| 300 | 4-nitro-2-amino-1-hydroxybenzene-6-sulphonic acid → 1-amino-8-hydroxy-naphthalene-3,6-disulphonic acid | 4-nitro-2-amino-1-hydroxybenzene → 2-hydroxynaphthalene | black |
| 301 | " | " | black |
| 302 | " | " | black |
| 303 | " | 4-nitro-2-amino-1-hydroxybenzene → 2-hydroxynaphthalene-6-sulphonic acid | black |
| 304 | " | " | black |
| 305 | " | 4-nitro-2-amino-1-hydroxybenzene → 1-hydroxynaphthalene-4-sulphonic acid | navy blue |
| 306 | " | 6-nitro-2-amino-1-hydroxybenzene-4-sulphonic acid → 2-hydroxynaphthalene | black |
| 307 | " | 4-nitro-2-amino-1-hydroxybenzene → 1-acetylamino-7-hydroxynaphthalene | black |
| 308 | " | 6-nitro-1-amino-2-hydroxynaphthalene-4-sulphonic acid → 2-hydroxynaphthalene | black |
| 309 | 4-nitro-2-amino-1-hydroxybenzene-6-sulphonic acid → 1-amino-8-hydroxy-naphthalene-4,6-disulphonic acid | 4-nitro-2-amino-1-hydroxynaphthalene-6-sulphonic acid → 2-hydroxynaphthalene | black |
| 310 | 4-chloro-2-amino-1-hydroxybenzene-6-sulphonic acid → 1-amino-8-hydroxy-naphthalene-3,6-disulphonic acid | 4-nitro-2-amino-1-hydroxybenzene → 2-hydroxynaphthalene | blue-black |
| 311 | " | " | blue-black |
| 312 | 4-chloro-2-amino-1-hydroxybenzene-6-sulphonic acid → 1-amino-8-hydroxy-naphthalene-3,6-disulphonic acid | 4-nitro-2-amino-1-hydroxybenzene → 2-hydroxynaphthalene-6-sulphonic acid | blue-black |
| 313 | " | 4-chloro-2-amino-1-hydroxybenzene → 2-hydroxynaphthalene | navy blue |
| 314 | " | 4-nitro-2-amino-1-hydroxybenzene → 1-acetylamino-8-hydroxynaphthalene-3,6-disulphonic acid | blue |
| 315 | " | 4-nitro-2-amino-1-hydroxybenzene → 1-amino-8-hydroxy-naphthalene-2,4-disulphonic acid | navy blue |
| 316 | " | 6-nitro-1-amino-2-hydroxynaphthalene-4-sulphonic acid → 2-hydroxynaphthalene | blue-black |
| 317 | " | 2-aminobenzene-1-carboxylic acid-5-sulphonic acid → 1-phenyl-3-methyl-5-pyrazolone | grey-green |
| 318 | 4-nitro-2-amino-1-hydroxybenzene-6-sulphonic acid → 1-amino-8-hydroxy-naphthalene-3,6-disulphonic acid | 6-nitro-1-amino-2-hydroxynaphthalene-4-sulphonic acid → 2-hydroxynaphthalene | black |
| 319 | 4-chloro-2-amino-1-hydroxybenzene-6-sulphonic acid → 1-amino-8-hydroxy-naphthalene-3,6-disulphonic acid | 4-chloro-2-amino-1-hydroxybenzene → 1-(4'-sulphophenyl)-3-methyl-5-pyrazolone | violet |
| 320 | 4-methyl-2-amino-1-hydroxybenzene-6-sulphonic acid → 1-amino-8-hydroxy-naphthalene-3,6-disulphonic acid | 4-chloro-2-amino-1-hydroxybenzene → 2-hydroxynaphthalene-6-sulphonic acid | reddish blue |
| 321 | 4-nitro-2-amino-1-hydroxybenzene-6-sulphonic acid → 1-amino-8-hydroxy-naphthalene-3,6-disulphonic acid | 5-nitro-1-amino-1-hydroxybenzene → 2-hydroxynaphthalene-6-sulphonic acid | black |
| 322 | " | 4-nitro-2-amino-1-hydroxybenzene → 2-hydroxynaphthalene-8-sulphonic acid | black |
| 323 | " | 4-nitro-2-amino-1-hydroxybenzene → 1-hydroxynaphthalene-5-sulphonic acid | black |
| 324 | " | 6-nitro-4-chloro-1-hydroxybenzene → 1-hydroxynaphthalene-5-sulphonic acid | black |

EXAMPLE 325

8.2 Parts 1-amino-4-[3'-amino-anilino]-anthraquinone-2-sulphonic acid are dissolved in a mixture of 160 parts of water and 80 parts dioxan with the addition of 1.05 parts sodium carbonate. 3.8 Parts 2,4,6-trifluoro-5-chloropyrimidine are added dropwise at 0° C. and a pH of 6 – 6.5 is maintained by the addition of a 2N sodium carbonate solution. When the acylation is completed, the dyestuff is salted out at 20° C. with 5 parts sodium chloride and the crystalline product is filtered off with suction, washed with a 2 percent sodium chloride solution and dried in a vacuum at 30° C.

The dyestuff dyes wool in blue shades very fast to wet processing.

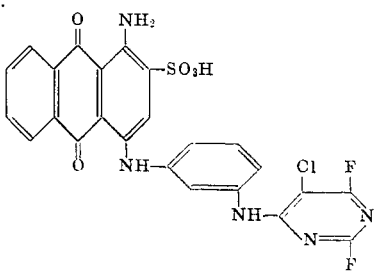

EXAMPLE 326

8.3 Parts 1-amino-4-[4'-amino-cyclohexylamino]-anthraquinone-2-sulphonic acid are dissolved in 160 parts of water and 80 parts dioxan with the addition of 1.3 parts of a 45 percent sodium hydroxide solution, and 3.8 parts 2,4,6-trifluoro-5-chloropyrimidine are added dropwise at 0° – 5° C. A pH of 9 – 10 is maintained by the addition of a 2N sodium carbonate solution. When the acylation is completed, the pH is adjusted to 4.5 by the addition of hydrochloric acid. The crystalline product is filtered off with suction and washed with a 2 percent sodium chloride solution until the runnings are colorless. The dyestuff obtained is dried in a vacuum at 30° – 40° C; it dyes wool in clear blue shades fast to washing.

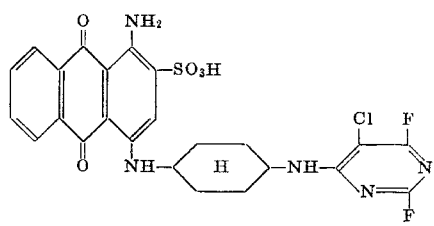

EXAMPLE 327

15.9 Parts of 1-amino-8-hydroxynaphthalene-3,6-disulphonic acid are dissolved in 150 parts of water and acylated at 20° C. and a pH of 5.5 – 6 with 10.2 parts dichlorodifluoropyrimidine. The liberated hydrogen fluoride is neutralized by means of a 2N sodium hydroxide solution. For coupling the mixture is diluted with 450 parts of water, 10 parts sodium carbonate are added and a suspension containing 9.9 parts of diazotized 2-aminobenzene-sulphonic acid is poured in at 0° C. The pH is kept at 7 – 8. When the reaction is completed, the pH is adjusted to 6, the product is salted out with 100 parts sodium chloride, filtered off with suction and washed with a 20 percent sodium chloride solution. There is obtained the red dyestuff of the formula

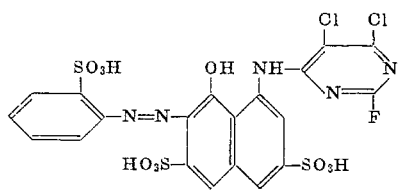

which dyes cotton from a long bath at 20° – 40° C. in red shades fast to wet processing.

EXAMPLE 328

15.9 Parts 1-amino-8-hydroxynaphthalene-3,6-disulphonic acid are dissolved in 150 parts of water and acylated at 20° – 25° C. with 8.3 parts 2,4-difluoro-6-chloropyrimidine. The liberated hydrogen fluoride is neutralized by means of a sodium hydroxide solution. Working up is carried out according to Example 327. There is obtained the red dyestuff

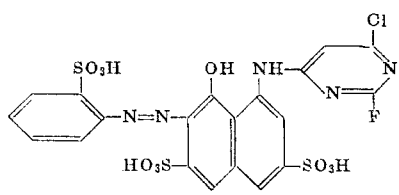

which dyes cotton at about 30° – 50° C.

EXAMPLE 329

8.2 Parts 1-amino-4-(p-amino-anilino)-anthraquinone-2-sulphonic acid are dissolved in a mixture of 160 parts of water and 80 parts dioxan and reacted with 3.8 parts trifluoro-chloropyrimidine at 0° C. and a pH of 6 – 7. This pH is maintained by means of a 2N sodium hydroxide solution. When the reaction is completed, the product is filtered off with suction at 20° C. and washed with a 2 percent sodium chloride solution. It is dried at 60° C. The dyestuff

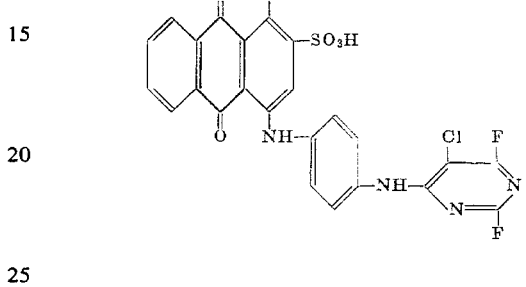

dyes wool in greenish blue shades of good fastness to wet processing.

EXAMPLE 330

7.6 Parts 2-hydroxynaphthalene-6,8-disulphonic acid are dissolved in 100 parts of water by the addition of sodium carbonate. A suspension of the diazonium salt from 1-amino-3-(2',6'-difluoro-5'-chloro-pyrimidinyl-4')-aminobenzene-6-sulphonic acid (prepared from 4.7 parts 1,3-diaminobenzene-4-sulphonic acid according to Example 30) is then added at 0° C. and a pH of 8 is maintained. After acidification, the product is salted out with 20 parts NaCl, the crystalline reaction product is filtered off with suction and washed with a 20 percent sodium chloride solution. The dyestuff is dried at 60° C. It dyes wool in clear orange shades of good fastness to milling and potting.

EXAMPLE 331

9.5 Parts 1-amino-4-(p-amino-phenylamino)-anthraquinone-2,6,2'-trisulphonic acid are dissolved in 95 parts of water, and 5.0 parts 2,4,6-trifluoro-5-chloro-pyrimidine are added dropwise at 20° – 25° C. The pH is kept between 6 and 7. When the reaction is completed, the precipitated reaction product

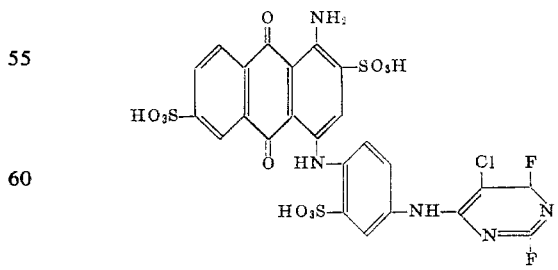

is filtered off with suction and washed with a 5 percent sodium chloride solution. It is dried in a vacuum at 60° C.

EXAMPLE 332

Fifty seven Parts 1-amino-4-(p-amino-phenylamino)-anthraquinone-2,6,3'-trisulphonic acid are dissolved in 600 parts of water and mixed with 18 parts trifluoro-chloropyrimidine. A pH of 6 – 7 is maintained by means of a sodium hydroxide solution. Working up is carried out according to Example 331. There is obtained the blue-green dyestuff

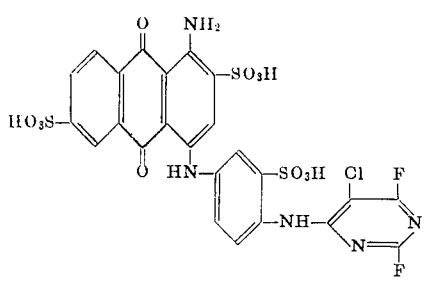

EXAMPLE 333

15.9 Parts 1-amino-8-hydroxynaphthalene-3,6-disulphonic acid are dissolved in 150 parts of water and reacted at pH 6 – 7 with 10 parts 2,4-difluoro-5-chloro-pyrimidine. The liberated hydrogen fluoride is neutralized by means of a 2N sodium hydroxide solution. Coupling and working up are carried out according to Example 327. There is obtained the dyestuff

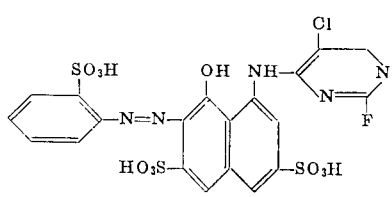

which dyes cotton at 60° C. in an alkaline medium in bluish red shades fast to wet processing.

EXAMPLE 334

15.9 Parts 1-amino-8-hydroxynaphthalene-4,6-disulphonic acid are dissolved in 150 parts of water and acylated at pH 6 – 7 with 6 parts difluoro-pyrimidine. Coupling and working up are carried out according to Example 327. There is obtained the dyestuff

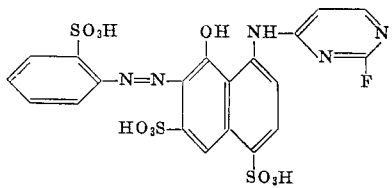

which yields red prints of good fastness to wet processing on cotton.

EXAMPLE 335

15.9 Parts 1-amino-8-hydroxynaphthalene-3,6-disulphonic acid are dissolved in 150 parts of water and reacted with 9 parts tetrafluoro-pyrimidine at a pH of 5.5 – 6. Coupling and working up are carried out according to Example 327. There is obtained the dyestuff

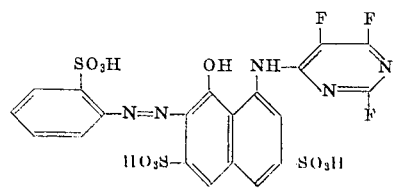

which dyes cotton from a long bath in fast red shades.

EXAMPLE 336

12.2 Parts 1-amino-4-(p-amino-phenylamino)-anthraquinone-2,2'-disulphone-6-carboxylic acid are dissolved in 360 parts of water and acylated at pH 6 with 3.7 parts difluoro-dichloro-pyrimidine. The resultant dyestuff

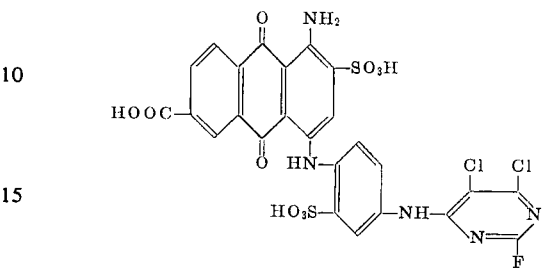

is salted out with 10 g sodium chloride, filtered off with suction and washed with a 10% sodium chloride solution. The dyestuff dyes wool in a greenish blue shade of very good fastness to milling and potting.

EXAMPLE 337

A suspension of the diazonium salt from 1-amino-3-(2',6'-difluoro-5'-chloro-pyrimidinyl-4')-aminobenzene-sulphonic acid (prepared from 5.7 parts 1,3-diaminobenzene-4-sulphonic acid according to Example 30) is added at pH 8 and 0° – 5° C. to a solution of 15.1 parts of the acidic coupling product obtained from 1-amino-8-hydroxynaphthalene-3,6-disulphonic acid and diazotized o-sulphanilic acid, in 150 parts of water. A pH of 8 is maintained during the coupling and the pH is adjusted to 6 when the reaction is completed. The dyestuff

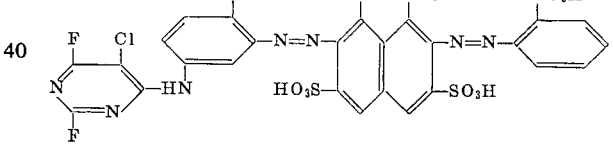

is salted out with 100 parts sodium chloride, filtered off with suction and dried in a vacuum at 60° C. A black shade is obtained on cotton by dyeing from a long bath.

EXAMPLE 338

Ten Parts 1-amino-4-(3'-[2'',6''-difluoro-5''-chloropyrimidinyl-amino]-anilino)-anthraquinone-2-sulphonic acid are introduced at 0° C. into 70 parts of 13 percent oleum. Towards the end of the reaction, the temperature is raised to 20° C., and when the sulphonation is completed, the reaction mixture is introduced into a mixture of 220 parts of ice-water and 30 parts potassium chloride. The product which crystallizes very well is filtered off with suction and washed with a saturated potassium chloride solution until neutral. The dyestuff of the probable formula

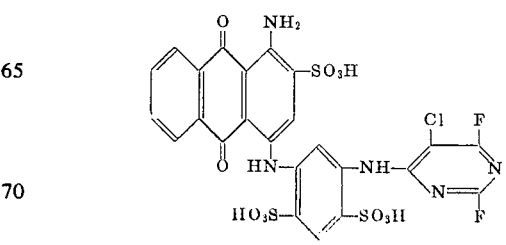

dyes cotton and wool in reddish blue shades of good fastness to wet processing.

EXAMPLE 339

10 Parts 1-amino-4-(3'-[2'',6''-difluoro-5''-chloropyrimidinyl]-anilino)-anthraquinone-2,6-disulphonic acid are dissolved at 0° C. in 65 parts of 13 percent oleum and when the sulphonation is completed, the reaction mixture is introduced into a mixture of 220 parts of ice and 30 parts potassium chloride. The product is filtered off with suction, washed with a saturated potassium chloride solution and dried at 60° C. in a vacuum. Blue prints of good fastness to wet processing are obtained on cotton.

EXAMPLE 340

79.9 Parts 1-amino-8-hydroxynaphthalene-3,6-disulphonic acid are dissolved in 500 parts of water, and a suspension of the diazo salt from 1-amino-3-(2',6'-difluoro-5'-chloropyrimidinyl-4')-aminobenzene-6-sulphonic acid (prepared from 47 parts 1,3-diaminobenzene-sulphonic acid according to Example 30) is added thereto. A pH of 4.5 is adjusted by means of a sodium acetate solution, and when the coupling is completed, the crystalline reaction product is filtered off with suction and washed with a 10 percent sodium chloride solution. The dyestuff is dried in a vacuum at 60° C.

EXAMPLE 341

36.6 Parts of the monazo dyestuff of Example 340 are dissolved in 460 parts of water and 6.7 parts sodium carbonate, and the diazonium solution from 4.7 parts aniline is introduced at 0° – 5° C. while maintaining a pH of 8 – 8.5. The mixture is further stirred for about 3 hours, a pH of 5.5 is adjusted by means of hydrochloric acid, the product is filtered off with suction and washed with a 5 percent sodium chloride solution. The dyestuff

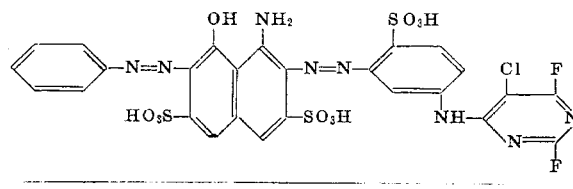

is dried at 60° C. in vacuum and gives a black shade on cotton and staple fiber with a yield of 8 – 10 percent.

Valuable dyestuff are also obtained by replacing the aniline in this Example with equivalent amounts of the diazo components stated in the following Table:

| Example No. | Diazo component | Shade |
|---|---|---|
| 342 | 2-amino-benzene-1-sulphonic acid | black |
| 343 | 2-amino-5-chloro-benzene-1-sulphonic acid | black |
| 344 | 2-amino-5-methyl-benzene-1-sulphonic acid | black |
| 345 | 2-amino-5-nitro-benzene-1-sulphonic acid | black |
| 346 | 2-amino-naphthalene-1-sulphonic acid | black |
| 347 | dehydro-p-toluidine-disulphonic acid | black |
| 348 | 2-amino-naphthalene-1,5-disulphonic acid | black |

EXAMPLE 349

In analogy with Example 340 there is obtained from 1,4-diaminobenzene-sulphonic acid the dyestuff of the following formula:

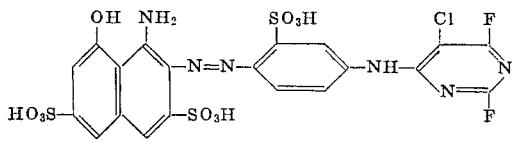

If this is coupled with the following diazo components, black dyestuffs are also obtained:

| Example No. | Diazo component | Shade |
|---|---|---|
| 350 | 2-amino-benzene-1-sulphonic acid | black |
| 351 | 2-amino-5-nitro-benzene-1-sulphonic acid | black |
| 352 | 2-amino-5-methyl-benzene-1-sulphonic acid | black |
| 353 | 2-amino-naphthalene-1,6-disulphonic acid | black |
| 354 | 2-amino-naphthalene-1,7-disulphonic acid | black |
| 355 | p-toluidine | black |

EXAMPLE 356

9.4 Parts P-phenylene-diamino-2-sulphonic acid are dissolved in 95 parts of water at pH 7 and acylated at 0° – 5° C. with 9.3 parts 5-chloro-2,4,6-trifluoro-pyrimidine while maintaining the pH value by the dropwise addition of a 2N sodium hydroxide solution. The reaction mixture is diluted with 70 parts of water, 3.5 parts sodium nitrite are added, and the mixture is poured with good stirring at 0° – 5° C. into a mixture of 150 parts of water and 13 parts of concentrated hydrochloric acid. The excess nitrite is destroyed by means of amidosulphonic acid after one hour, and the suspension of the diazonium salt is added at 0° – 5° C. to a solution of 15.9 parts 1-amino-8-hydroxynaphthalene-2,4-disulphonic acid in 100 parts of a 8 percent sodium carbonate solution. The pH value is kept at 8 until the coupling is completed, then adjusted to pH 5.5 by means of hydrochloric acid, and the dyestuff is salted out. The product is filtered off with suction, washed with a sodium chloride solution and dried at 60° C. in a vacuum. Violet dyeings of good fastness to wet processing are obtained on cotton or wool.

Valuable reactive dyestuffs are also obtained by using in the present Example the compounds stated in the following Table as coupling components:

| Example No. | Coupling component | Shade |
|---|---|---|
| 357 | 2-methylamino-8-hydroxynaphthalene-6- | bluish red |
| 358 | 2-hydroxynaphthalene-6,8-disulphonic acid | orange |
| 359 | 1-acetylamino-8-hydroxynaphthalene-4,6-disulphonic acid | red |

EXAMPLE 360

15.9 Parts 1-amino-8-hydroxynaphthalene-4,6-disulphonic acid are dissolved in 100 parts of water and acylated at 0° C. with 9.3 parts trifluoro-chloro-pyrimidine. A pH value of 6.5 – 7 is maintained. Coupling is carried out with a solution of diazotized aniline at 0° C. and a pH of 7 – 8. When the reaction is completed, the pH is adjusted to 6, the reaction product is filtered off with suction and washed with a 5 percent sodium chloride solution. The dyestuff

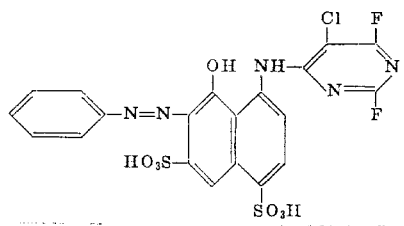

is dried at 60° C. in a vacuum and dyes cotton in red shades fast to wet processing.

EXAMPLE 361

Six Parts 1-amino-4-(4'-N-methylaminomethyl-anilino)-anthraquinone-2,6,2'-trisulphonic acid are dissolved in 160 parts of water and acylated at 0° – 5° C. with 2 parts 5-nitro-2,4-difluoro-pyrimidine. A pH of 6.5 – 7 is maintained by means of a sodium hydroxide solution. When the reaction is completed, the product is salted out with sodium chloride, filtered off with suction and dried in a vacuum. The dyestuff

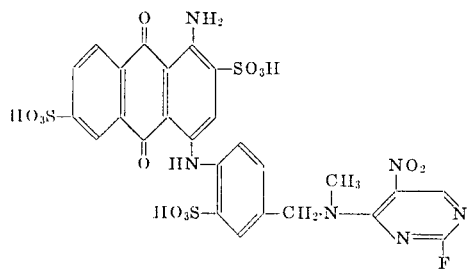

gives blue shades on wool.

EXAMPLE 362

12.3 Parts of the dyestuff prepared by coupling 1-(5'-chloro-2',6'-difluoro-pyrimidinyl-amino)-8-hydroxynaphthalene-3,6-disulphonic acid with diazotized aniline are dissolved at 0° C. in 160 parts of 10 percent oleum and when the sulphonation is completed, the reaction mixture is poured on to a mixture of 500 parts of ice and 120 parts sodium chloride, the product is filtered off with suction and washed with a saturated sodium chloride solution. It is dried in a vacuum at 80° C. Cotton is dyed in fast red shades.

EXAMPLE 363

10.0 Parts 1-amino-4-(2',6'-dimethyl-anilino-3'-sulphonamido)-anthraquinone-2-sulphonic acid are dissolved in 150 parts of water and the pH is adjusted to 12. Acylation is carried out with 3.7 parts trifluoro-chloro-pyrimidine and when the reaction is completed, the pH is adjusted to 5, the product is salted out with 25 parts potassium chloride, filtered off with suction and washed with an ice-cold 15 percent potassium chloride solution. The dyestuff

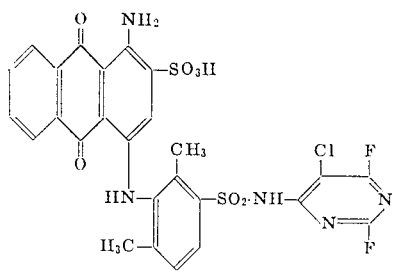

is dried in a vacuum at 60° C. and dyes wool in clear blue shades.

EXAMPLE 364

Twenty six Parts 1-amino-4-(4'-N-methylaminomethyl-anilino)-anthraquinone-2,2'-disulphonic acid are dissolved in 560 parts of water and acylated at 0° – 5° C. with 10.2 parts difluoro-dichloro-pyrimidine. A pH of 6 – 6.5 is maintained by means of a 2N sodium hydroxide solution. The pH is adjusted to 1.5 by the addition of 10 parts of concentrated hydrochloric acid, the product is filtered off with suction and washed with a 5 percent sodium chloride solution. The dyestuff

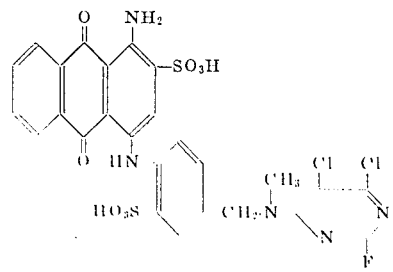

is dried in a vacuum at 60° C. and dyes cotton in fast clear blue shades.

EXAMPLE 365

13.3 Parts 1-amino-4-(4'-N-methylaminomethyl-anilino)-anthraquinone-2,6,2'-trisulphonic acid are dissolved in 360 parts of water and acylated at 20° – 25° C. with 6 parts 2,4,6-trifluoro-pyrimidine. A pH value of 6 – 7 is maintained by the addition of a 2N sodium hydroxide solution. When the reaction is completed, the product is rapidly salted out with 65 parts sodium chloride and dried at 60° C. in a vacuum. The resultant dyestuff

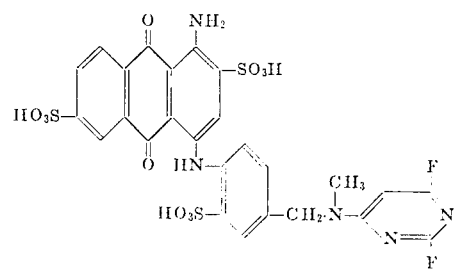

yields a greenish blue dyeing on wool.

Valuable dyestuffs can be obtained in an analogous manner from the following components:

| Example No. | Dyestuff | Reactive component | Shade |
| --- | --- | --- | --- |
| 366 | 1-amino-4-(4'-N-methyl-aminomethyl-anilino)-anthraquinone-2,6,2'-trisulphonic acid | 2,4-difluoro-6-chloropyrimidine | greenish blue |
| 367 | 1-amino-4-(4'-N-methyl-aminomethyl-anilino)-anthraquinone-2,7,2'-trisulphonic acid | 2,4-difluoro-5-chloro-pyrimidine | blue |
| 368 | 1-amino-4-(4'-amino-anilino)-anthraquinone-2,7-disulphonic acid | 2,4-difluoro-6-di-fluoromethyl-5-chloro-pyrimidine | blue-green |
| 369 | 1-amino-4-(4'-N-methyl-aminomethyl-anilino)-anthraquinone-2,6,2'-trisulphonic acid | 2,4-difluoro-6-trifluoromethyl-5-chloro-pyrimidine | blue |

EXAMPLE 370

A suspension of the diazonium salt from 1-amino-5-(2',6'-difluoro-5'-chloro-pyrimidinyl-amino-4')-benzene-2-sulphonic acid (prepared from 18.8 parts 1,5-diaminobenzene-2-sulphonic acid according to Example 30) is poured at 0° – 5° C. into a solution of 15.6 parts 1-amino-8-hydroxynaphthalene-3,6-disulphonic acid in 100 parts of a 3 percent sodium carbonate solution, and a pH of 4 – 4.5 is maintained by the addition of sodium acetate. When the coupling is completed, 5.7 parts of a sodium carbonate solution are added and stirring is continued for 3 hours at a pH of 7.5 – 8. The dyestuff formed is salted out with 100 parts sodium chloride, filtered off with suction and washed with a 15 percent sodium chloride solution. It is dried at 60° C. in a vacuum. The dyestuff obtained yields a black dyeing of very good fastness to wet processing on cotton.

Similar dyestuffs are obtained when the following diazo components are used in the present Example:

| Example | |
|---|---|
| 371 | 1-amino-4-(2',6'-difluoro-5'-chloro-pyrimidinylamino-4')-benzene-2-sulphonic acid |
| 372 | 1-amino-3-(2'-fluoro-5',6'-dichloro-pryimidinylamino-4')-benzene-2-sulphonic acid |
| 373 | 1-methyl-2-(2',6'-difluoro-pyrimidinylamino-4')-4-amino-benzene-5-sulphonic acid |
| 374 | 1-amino-4-(2'-fluoro-5'-chloro-pyrimidinylamino-4')-benzene-2-sulphonic acid |

EXAMPLE 375

6.1 Parts 1-amino-4-(3'-aminomethyl-2',6'-dimethylanilino)-anthraquinone-2,6,5'-trisulphonic acid are dissolved in 65 parts of water and acylated at a pH of 6 with 2 parts chloro-trifluoro-pyrimidine. The pH value is adjusted by means of a 2N sodium hydroxide solution. The resultant dyestuff is salted out with 10 parts potassium chloride and washed with a 20 percent potassium chloride solution. It is dried in a vacuum at 60° C. The dyestuff

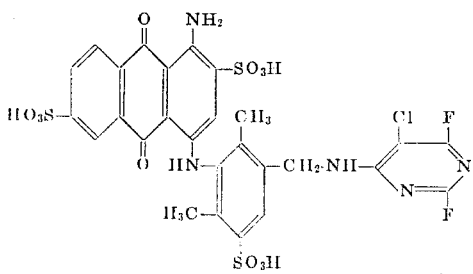

dyes wool in clear blue shades of good fastness to milling and perspiration.

EXAMPLE 376

10.6 Parts 1-amino-4-(3'-aminomethyl-2',6'-dimethylanilino)-anthraquinone-2,5'-disulphonic acid are dissolved in 110 parts of water. Acylation is carried out with 4.4 parts trifluoro-chloro-pyrimidine at 20° – 25° C. and a pH of 6 – 6.5. The pH is maintained by means of a 2N sodium hydroxide solution. When the reaction is completed, the resultant dyestuff

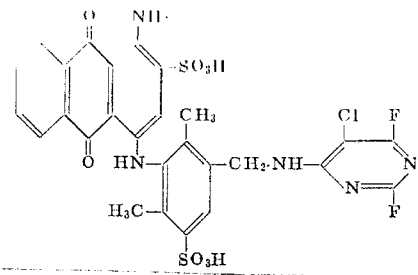

is salted out with 20 parts sodium chloride, filtered off with suction, and washed with a 10 percent sodium chloride solution. The dyestuff is dried at 60° C. in a vacuum and yields clear reddish blue dyeings fast to wet processing on cotton or wool.

EXAMPLE 377

7.8 Parts 1-amino-4-(3'-N-methylaminomethyl-2',6'-dimethyl-anilino)-anthraquinone-2,6,5'-trisulphonic acid are acylated in 85 parts of water at 20° – 25° C. with 2.3 parts 2,4,6-trifluoro-5-chloro-pyrimidine. A pH of 6 – 6.5 is maintained during the reaction by means of a 2N sodium carbonate solution. Before the rapid addition of 20 parts sodium chloride, a pH of 3.5 is adjusted with 1 part of concentrated hydrochloric acid. The product is washed with a saturated sodium chloride solution. The resultant dyestuff

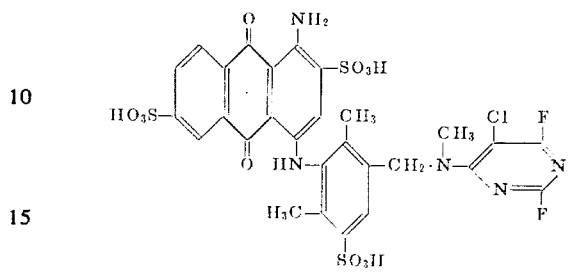

dyes wool or cotton in clear blue shades fast to wet processing.

EXAMPLE 378

7.6 Parts 1-amino-4-(3'-N-methylaminomethyl-2',6'-dimethyl-anilino)-anthraquinone-2,6-disulphonic acid are dissolved in 250 parts of water and acylated with 3.1 parts trifluoro-chloro-pyrimidine under the following conditions: pH 6 – 6.5, temperature 20° – 25° C. The pH is maintained by the addition of a 2N sodium hydroxide solution. When the reaction is completed, the reaction mixture is salted out with 10 parts sodium chloride and washed with a 2 percent sodium chloride solution. Clear blue shades fast to wet processing are obtained on cotton or wool.

When the components stated in the following Table are used in analogy with the methods described in Examples 375 – 378, valuable dyestuffs are also obtained, which dye cotton and wool in reddish to greenish blue clear shades:

| Example No. | Dyestuff | Reactive component |
|---|---|---|
| 379 | 1-amino-4-(3'-N-methylaminomethyl-2',6'-dimethyl-anilino)-anthraquinone-2,7-disulphonic acid | 2,4-difluoro-5,6-dichloro-pyrimidine |
| 380 | 1-amino-4-(3'-N-methylaminomethyl-2',6'-dimethyl-anilino)-anthraquinone-2,7,5'-trisulphonic acid | 2,4-difluoro-6-chloro-pyrimidine |
| 381 | 1-amino-4-(4'-N-methylaminomethyl-2',6'-dimethyl-anilino)-anthraquinone-2,6,5'-trisulphonic acid | 2,4,6-trifluoro-pyrimidine |
| 382 | 1-amino-4-(3'-N-methylaminomethyl-2',6'-dimethyl-anilino)-anthraquinone-2,6,4'-trisulphonic acid | 2,4-difluoro-5,6-dichloro-pyrimidine |
| 383 | 1-amino-4-(3'-aminomethyl-4'-methyl-anilino)-anthraquinone-2,6,6'-trisulphonic acid | 2,4,6-trifluoro-5-difluoromethyl-pyrimidine |
| 384 | 1-amino-4-(3'-aminomethyl-4'-methyl-anilino)-anthraquinone-2,6'-disulphonic acid | 2,4,6-trifluoro-5-trifluoromethyl-pyrimidine |
| 385 | 1-amino-4-(3'-aminomethyl-4'-methyl-anilino)-anthraquinone-2,7,6'-trisulphonic acid | 2,4-difluoro-5-trifluoromethyl-pyrimidine |
| 386 | 1-amino-4-(3'-methylamino-4'-methoxy-anilino)-anthraquinone-2,7,6'-trisulphonic acid | 2,4-difluoro-5-carbonamido-pyrimidine |
| 387 | 1-amino-4-(4'-amino-anilino)-anthraquinone-2,3',6-tri-sulphonic acid | 2,4-difluoro-5-chloro-6-phenyl-pyrimidine |
| 388 | 1-amino-4-(3'-amino-anilino)-anthraquinone-2,6-disulphonic acid | 2,4-difluoro-5-cyano-pyrimidine |
| 389 | 1-amino-4-(4'-amino-anilino)-anthraquinone-2,6-disulphonic acid | 2,4-difluoro-5-carboethoxy-pyrimidine |
| 390 | 1-amino-4-(4'-amino-anilino)-anthraquinone-2,7-disulphonic acid | 2,4-difluoro-5-methylsulphon-yl-pyrimidine |
| 391 | 1-amino-4-(3'-amino-anilino)-anthraquinone-2,7-disulphonic acid | 2,4,6-trifluoro-5-bromo-pyrimidine |
| 392 | 1-amino-4-(2',4',6'-trimethyl-3'-amino-anilino)-anthraquinone-2,5'-disulphonic acid | 2,4,6-trifluoro-5-chloro-pyrimidine |

EXAMPLE 393

11.9 Parts of 2-amino-8-hydroxynaphthalene-6-sulphonic acid are dissolved in 56 parts of water and 2.8 parts of sodium carbonate. To this solution a suspension of the diazonium salt of 1-amino-3-(2',6'-difluoro-5'-chloropyrimidinyl-4')-aminobenzene-6-sulphonic acid, which has been prepared according to Example 30 from 9.4 parts of 1,3-diaminobenzene-4-sulphonic acid, is added at 0° to 5° C and the pH adjusted to 3.5 to 4 by means of sodium acetate solution. After completion of the coupling the reaction product is filtered with suction and washed with 2 percent sodium chloride solution. The dyestuff obtained is dried at 60° C. in vacuo. It has the formula

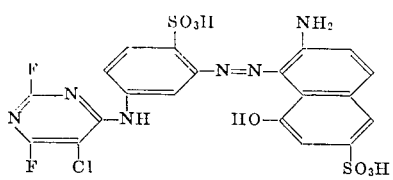

and dyes wool very clear red shades fast to wet processing.

EXAMPLE 394

48.5 Parts of the sodium salt of 1-p-aminobenzoylamino-8-hydroxynaphthalene-3,6-disulphonic acid are dissolved in 400 parts of water, 20 parts of 2,4,6-trifluoro-5-chloro-pyrimidine added thereto dropwise at 8° to 10° C. and the pH maintained at 5.5 to 6 while continuously neutralizing the hydrofluoric acid set free. The reaction is controlled chromatographically. The reaction mixture obtained is diluted with 900 parts of water and coupled at 0° to 5° C at a pH of 7 to 8 with 17.5 parts of diazotized 2-aminobenzene-sulphonic acid, dissolved in 200 parts of water. At a final pH of 6.5 the reaction product is precipitated with sodium chloride, filtered with suction and the filter residue washed with sodium chloride solution. One obtains a clear red dyestuff of the formula

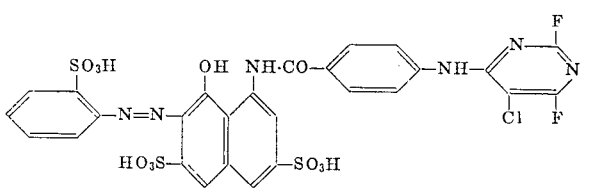

A somewhat bluish red dyestuff is obtained by using as aminonaphthalene starting component 2-aminonaphthalene-1,5-disulphonic acid.

EXAMPLE 395

0.1 Part of the copper complex of the formula

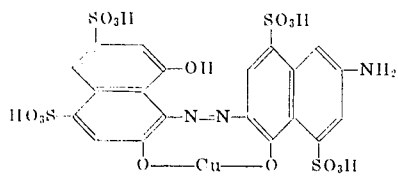

which has been prepared in accordance with the method described in German Patent Specification 1,117,235 by coupling of diazotized 1-amino-8-(benzenesulphonyl-hydroxy)-naphthalene-4,6-disulphonic acid in soda-alkaline medium with the equivalent amount of 2-acetylamino-5-hydroxynaphthalene-4,8-disulphonic acid, oxidatively coppering the monoazo dyestuff thus obtained and saponifying the acetylamino and benzenesulphonyl-hydroxy group, is dissolved in 2,500 parts of water at 60° to 65° C. and at a pH of 6 to 6.5, and 0.12 parts of 2,4,6-trifluoro-5-chloropyrimidine are added thereto at 20° to 30° C. During the condensation reaction the pH is maintained at 6 to 6.5 by the addition of sodium carbonate solution. After completion of the acylation the dyestuff is precipitated, isolated and dried at 60° C. It dyes cotton clear greenish blue shades.

In an analogous manner the copper complex dyestuff of the following formula

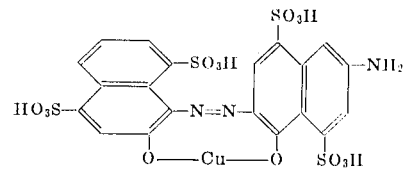

can be acylated; the dyestuff obtained yields clear bluish violet shades on cotton.

EXAMPLE 396

10 Parts of 1-amino-4-(3'-aminomethyl-4'-methylanilino)-anthraquinone-2,6,6'-trisulphonic acid are dissolved in 500 parts of water and acylated at 20° to 25° C. and at a pH of 6.5 to 7 with 5 parts of 5-chloro-2,4,6-trifluoro-pyrimidine. After completion of the acylation the reaction mixture is adjusted to pH 4 with hydrochloric acid, the dyestuff salted out with 50 parts of sodium chloride, filtered with suction and washed with 15 percent sodium chloride solution. The dyestuff is then dried at 60° C. in vacuo. It dyes wool fast blue shades and has the formula

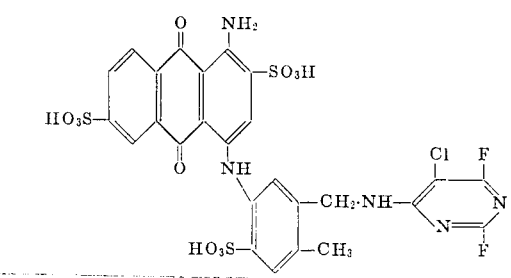

EXAMPLE 397

13.9 Parts of 1-amino-4-(2'-methyl-3'-amino-anilino)-anthraquinone-2,5',6-trisulphonic acid are dissolved in 210 parts of water and acylated at 20° to 25° C. and a pH of 6.0 to 6.5 with 4.5 parts of 5-chloro-2,4,6-trifluoropyrimidine. The reaction mixture is salted out at pH 5 with 26 parts of sodium chloride, the crystalline product is filtered with suction and washed with 15 percent sodium chloride solution. The dyestuff is dried in vacuo at 60° C. It has the formula

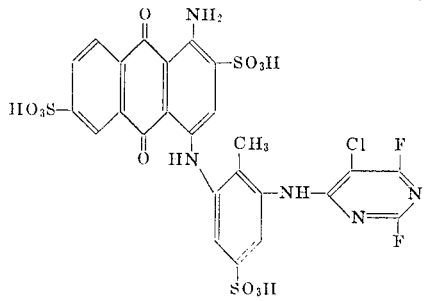

and dyes wool blue shades fast to wet processing.

In an analogous manner the following dyestuffs can be acylated with 2,4,6-trifluoro-5-chloropyrimidine:

| Example | |
|---|---|
| 398 | 1-amino-4-(2',6'-dimethyl-3'-methylaminomethyl-anilino)-anthraquinone-2,5-disulphonic acid |
| 399 | 1-amino-4-(2'-methyl-3'-amino-anilino)-anthraquinone-2,5'-disulphonic acid |

| | |
|---|---|
| 400 | 1-amino-4-(3'-methylaminomethyl-4'-methoxy-anilino)-anthraquinone-2,6'-disulphonic acid |
| 401 | 1-amino-4-(3'-methylaminomethyl-4'-methoxy-anilino)-anthraquinone-2,6,6'-trisulphonic acid |
| 402 | 1-amino-4-(3'-methylaminomethyl-4'-methoxy-anilino)-anthraquinone-2,6',8-trisulphonic acid |
| 403 | 1-amino-4-(3'-methylaminomethyl-4'-methoxy-anilino)-anthraquinone-2,5'-disulphonic acid |
| 404 | 1-amino-4-(4'-amino-anilino)-anthraquinone-2,8-disulphonic acid |
| 405 | 1-amino-4-(3'-amino-anilino)-anthraquinone-2,8-disulphonic acid |
| 406 | 1-amino-4-(4'-amino-anilino)-anthraquinone-2,7-disulphonic acid |
| 407 | 1-amino-4-(3'-amino-2'-methyl-anilino)-anthraquinone-2,5-disulphonic acid |
| 408 | 1-amino-4-(3'-aminomethyl-anilino)-anthraquinone-2,8-disulphonic acid |
| 409 | 1-amino-4-(3'-aminomethyl-anilino)-anthraquinone-2,5,6'-trisulphonic acid |
| 410 | 1-amino-4-(3'-aminomethyl-anilino)-anthraquinone-2,7-disulphonic acid |
| 411 | 1-amino-4-(4'-aminomethyl-anilino)-anthraquinone-2,6-disulphonic acid |
| 412 | 1-amino-4-(3'-aminomethyl-4'-methoxy-anilino)-anthraquinone-2,8-disulphonic acid |
| 413 | 1-amino-4-(3'-aminomethyl-4'-methoxy-anilino)-anthraquinone-2,5,6'-trisulphonic acid |
| 414 | 1-amino-4-(3'-aminomethyl-4'-methoxy-anilino)-anthraquinone-2,7-disulphonic acid |
| 415 | 1-amino-4-(2',6'-dimethyl-3'-aminomethyl-anilino)-anthraquinone-2,7-disulphonic acid |
| 416 | 1-amino-4-(2',6'-dimethyl-3'-aminomethyl-anilino)-anthraquinone-2,5-disulphonic acid |
| 417 | 1-amino-4-(2',6'-dimethyl-3'-aminomethyl-anilino)-anthraquinone-2,8,5'-trisulphonic acid |
| 418 | 1-amino-4-(2',6'-dimethyl-3'-methylaminomethyl-anilino)-anthraquinone-2,7-disulphonic acid |
| 419 | 1-amino-4-(2',6'-dimethyl-3'-methylaminomethyl-anilino)-anthraquinone-2,5',8-trisulphonic acid |

EXAMPLE 420

11 Parts of 1-amino-4-(3'-aminomethyl-4'-methylanilino)-anthraquinone-2,6'-disulphonic acid are dissolved in 500 parts of water and acylated at 0° to 5° C. and a pH of 10 with 6 parts of 5-chloro-2,4,6-trifluoropyrimidine. The reaction mixture is adjusted to pH 5 with hydrochloric acid and the dyestuff salted out with 20 parts of potassium chloride. The crystalline dyestuff is filtered with suction, washed with 5 percent potassium chloride solution and dried at 60° C. in vacuo. It has the formula

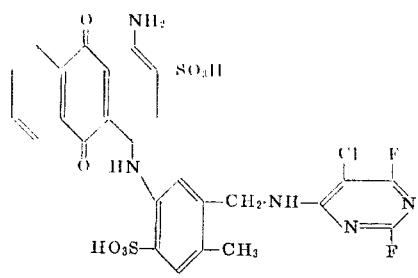

and dyes wool fast blue shades.

EXAMPLE 421

7.6 Parts of 1-amino-4-(4'-methyl-3'-aminomethyl-anilino)-anthraquinone-2,6-disulphonic acid are dissolved in 150 parts of a 10 percent aqueous caprolactam mixture of 20° to 25° C. and acylated at pH 6 to 6.5 with 3.1 parts of 5-chloro-2,4,6-trifluoropyrimidine. After completion of the reaction the reaction product is salted out and washed with 3 percent sodium chloride solution. The dyestuff is dried at 60° C. in vacuo. It dyes wool greenish blue shade.

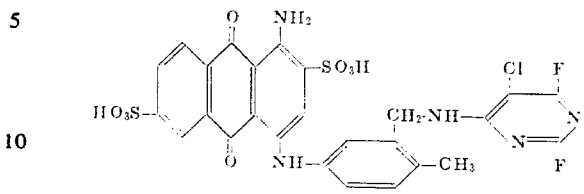

EXAMPLE 422

To the solution of 36.5 parts of the sodium salt of 1-amino-8-hydroxynaphthalene-4,6-disulphonic acid in 200 parts of water there are added dropwise at 8° to 10° C. 20 parts of 2,4,6-trifluoro-5-chloropyrimidine. A pH of 5.5 to 6 is maintained while continuously neutralizing the hydrofluoric acid set free. The reaction is controlled chromatographically. The solution of the dyestuff intermediate is added to 900 parts of water and coupled at a pH of 7 to 8 at 0° to 5° C. with 17.5 parts of diazotized 2-aminobenzene-sulphonic acid, dissolved in 200 parts of water. At a final pH of 6.5 the reaction product is salted out with sodium chloride, filtered with suction and washed with sodium chloride solution. The dyestuff is dried at 30° to 40° C. in vacuo. The dyestuff

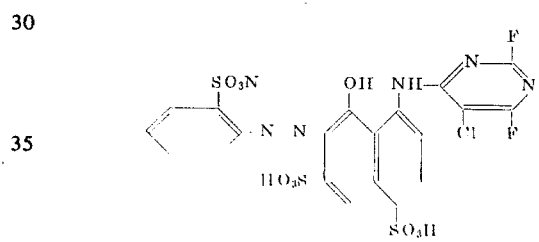

yields red needles and dyes cotton red shades fast to wet processing.

EXAMPLE 423

If in Example 64 somewhat less 1,3-diaminobenzene is used the dyestuff of the following formula

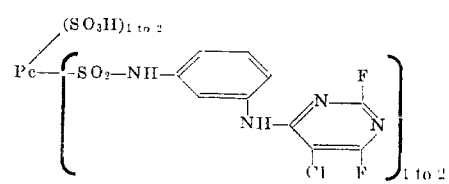

can be obtained which dyes cotton clear blue shades.

If in Example 64 the 1,3-diaminobenzene is replaced by ammonia and the phthalocyanine-sulphonic acid sulphonamide partially condensed at the sulphonamide group with 2,4,6-trifluoro-5-chloro-pyrimidine a dyestuff of the probable formula

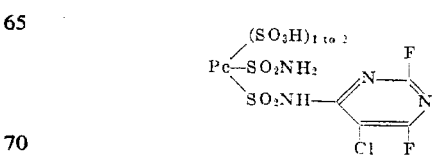

can be obtained which dyes cotton, regenerated cellulose and wool blue shades.

We claim:
1. A reactive dyestuff of the formula

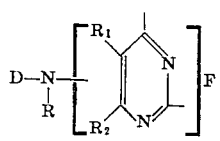

wherein D is the residue of a water-soluble azo, dyestuff; the

grouping being bonded directly to a carbon atom of the pyrimidine nucleus and to an aromatic carbocyclic carbon atom of D directly or via a bridge member selected from the group consisting of lower alkylene, $-SO_2-$, $-HNCO-$, $-CH_2NHCO(CH_{2dh}')_{1-2}$, $-HN-CH_2-CO-$, $-N(CH_3)-CH_2-CO-$, $-HN-CH_2CH_2-$,

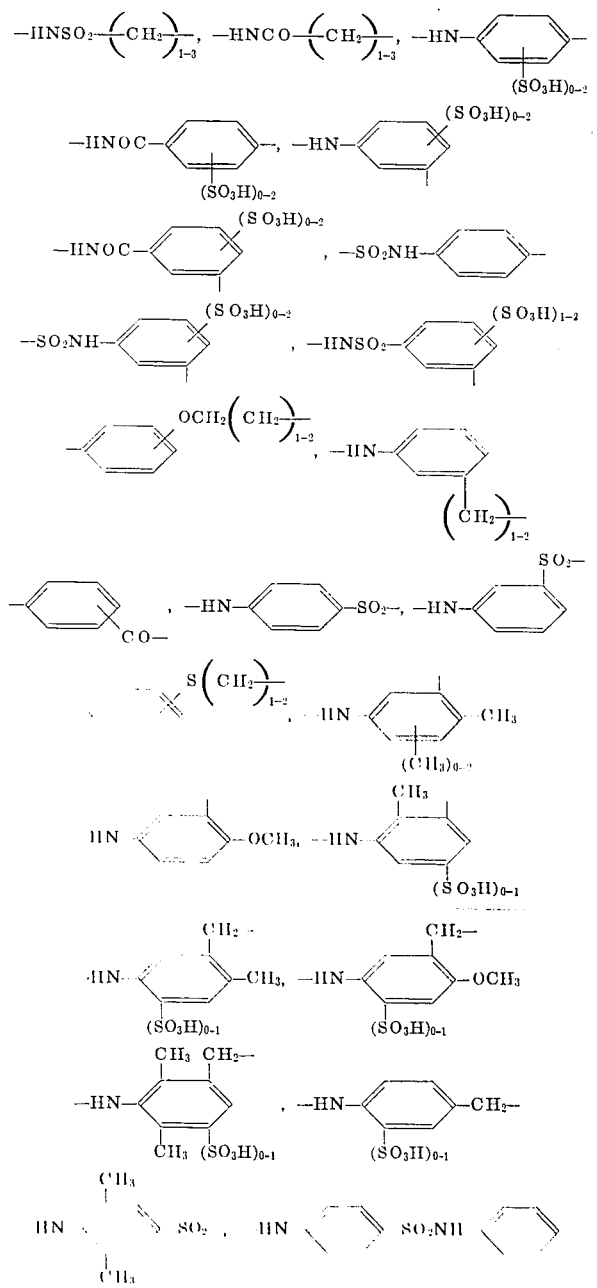

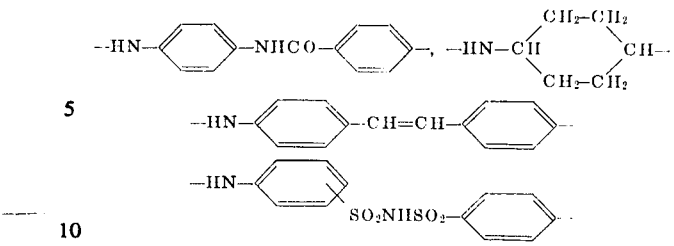

R is hydrogen or lower alkyl; $R_1$ is hydrogen, chloro, bromo, fluoro, lower alkyl, mono-, di-, or tri-chloromethyl, mono-, di- or tri-bromo- methyl, di- or tri-fluoromethyl, vinyl, allyl, nitro, cyano, carbo lower alkoxy, or lower alkyl sulfonyl; $R_2$ is hydrogen, chloro, bromo, fluoro, lower alkyl, mono-, di-, or tri-chloromethyl, mono-, di- or tri-bromomethyl, di- or tri-fluoromethyl, carbo lower alkoxy, lower alkyl sulfonyl, or p-chloro- phenylsulfonyl; and F is fluoro.

2. A reactive dyestuff of claim 1 wherein said dyestuff D contains at least one sulfonic acid group, and said group

is bonded to an aromatic carbocyclic carbon atom of D directly or via a bridge member which is methylene or ethylene.

3. A reactive dyestuff of Claim 1 having the formula

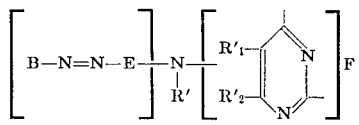

wherein B is a residue of the benzene or naphthalene series; E is a residue of a coupling component of the benzene series, naphthalene series, or pyrazolone series; R' is hydrogen or methyl; $R'_1$ and $R'_2$ are each independently hydrogen, chloro, bromo, or fluoro; and F is fluoro.

4. A reactive dyestuff of claim 1 having the formula

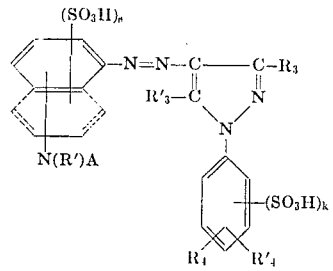

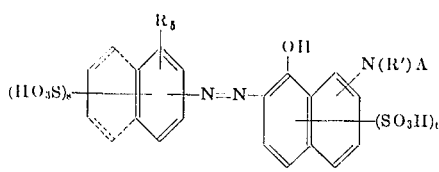

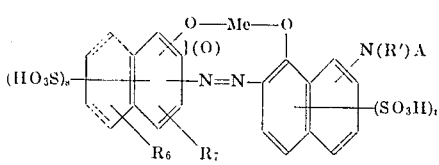

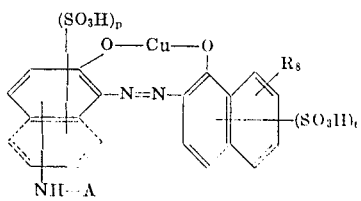

wherein A stands for the radical

R' is hydrogen or methyl; R'₁ and R'₂ independently are hydrogen, chloro, bromo, or fluoro; F is fluoro; (O){ indicates the substituents standing in adjacent positions in the aryl nucleus; Me is Cu, Cr or Co; R₃ is —CH₃ or —COOH; R'₃ is —OH or —NH₂; R₄ and R'₄ are each independently hydrogen, chloro, or methyl; R₅ is hydrogen, methoxy, or acylamino wherein "acyl" is lower alkylcarbonyl, lower alkylsulfonyl, phenylcarbonyl or phenylsulfonyl wherein the alkyl contains one–five carbon atoms; R₆ is hydrogen, hydroxyl, or nitro; R₇ is hydrogen, chloro, nitro; R₈ is amino or acylamino, wherein "acyl" has the aforementioned meaning; R₉ is amino or alkylamino of one–four carbon atoms in the alkyl group; q is the number 0 or 1; p is the number 0, 1, or 2; s is an integer from 0 to 3; t is an integer from 1 to 3 and k is the number 1 or 2.

5. A reactive dyestuff of claim 1 having the formula wherein D' stands for a sulphonic acid group containing azo, dyestuff, q stands for the number 0 or 1, R' stands for hydrogen, —CH₃ or —C₂H₅, R''₁ stands for Cl or F, R''₂ stands for Cl, F or CH₃, and F stands for fluoro, the group being bound to an aromatic carbocyclic carbon atom of D'.

6. A reactive dyestuff of claim 1 having the formula wherein D' stands for a sulphonic acid group containing azo, dyestuff, q stands for the number 0 or 1, q' stands for the number 0 or 1 and F stands for fluoro, the group being bound to an aromatic carbocyclic carbon atom of D'.

7. The dyestuff of claim 1 of the form

8. The dyestuff of claim 1 of the formula

9. The dyestuff of claim 1 of the formula

10. The dyestuff of claim 1 of the formula

11. The dyestuff of claim 1 of the formula

12. The dyestuff of claim 1 of the formula

13. The dyestuff of claim 2 of the formula

14. The dyestuff of claim 1 of the formula

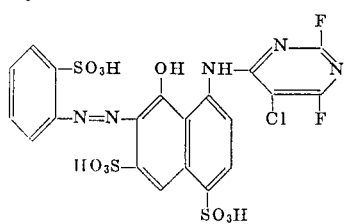

15. The dyestuff of claim 1 of the formula

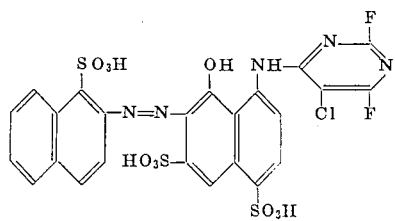

16. The dyestuff of claim 1 of the formula

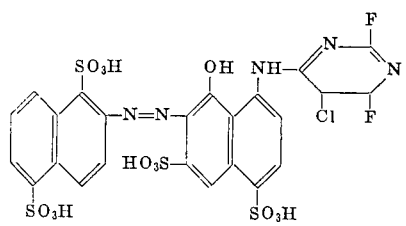

17. The dyestuff of claim 1 of the formula

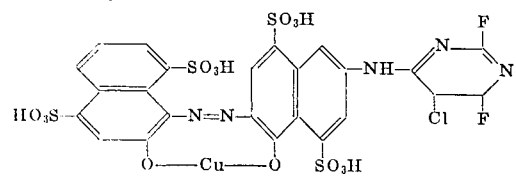

18. The dyestuff of claim 1 of the formula

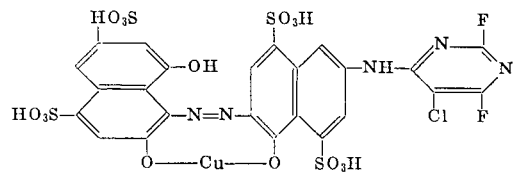

19. The dyestuff of claim 1 of the formula

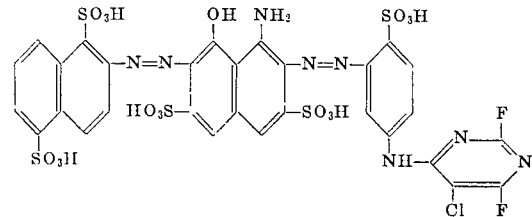

20. The dyestuff of claim 1 of the formula

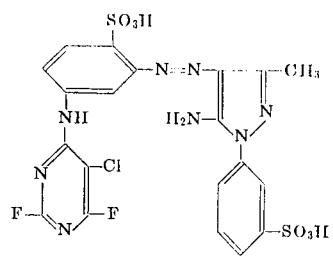

21. The dyestuff of claim 1 of the formula

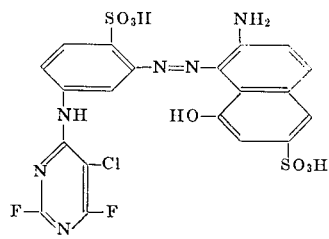

22. The dyestuff of claim 1 of the formula

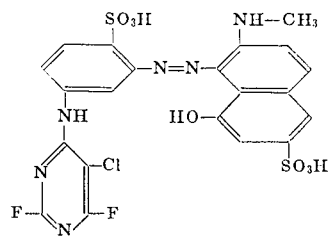

23. The dyestuff of claim 1 of the formula

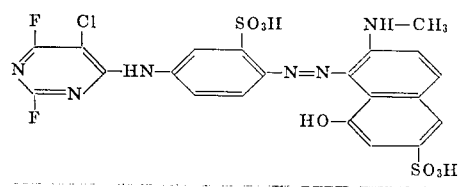

24. The dyestuff of claim 1 of the formula

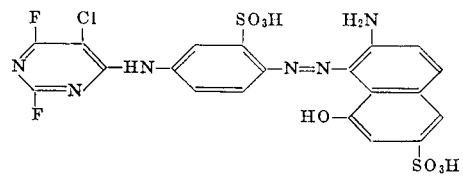

* * * * *